(12) United States Patent
Held et al.

(10) Patent No.: US 8,966,901 B2
(45) Date of Patent: *Mar. 3, 2015

(54) HEAT ENGINE AND HEAT TO ELECTRICITY SYSTEMS AND METHODS FOR WORKING FLUID FILL SYSTEM

(71) Applicant: Echogen Power Systems, Inc., Akron, OH (US)

(72) Inventors: Timothy J. Held, Akron, OH (US); Jason D. Miller, Hudson, OH (US)

(73) Assignee: Dresser-Rand Company, Olean, NY (US)

(*) Notice: Subject to any disclaimer, the term of this patent is extended or adjusted under 35 U.S.C. 154(b) by 145 days.

This patent is subject to a terminal disclaimer.

(21) Appl. No.: 13/633,966

(22) Filed: Oct. 3, 2012

(65) Prior Publication Data

US 2013/0033037 A1    Feb. 7, 2013

Related U.S. Application Data

(63) Continuation of application No. 12/880,428, filed on Sep. 13, 2010, now Pat. No. 8,281,593, which is a continuation-in-part of application No. 12/631,379, filed on Dec. 4, 2009, now Pat. No. 8,096,128.

(60) Provisional application No. 61/243,200, filed on Sep. 17, 2009.

(51) Int. Cl.
*F01K 25/02*    (2006.01)
*F01K 25/10*    (2006.01)
*F01K 3/18*     (2006.01)

(52) U.S. Cl.
CPC .............. *F01K 25/103* (2013.01); *F01K 3/185* (2013.01); *F24H 2240/12* (2013.01); *Y02T 10/16* (2013.01)
USPC ................... 60/645; 60/655; 60/660; 60/682

(58) Field of Classification Search
USPC .................... 60/645, 651, 659, 660–667, 671
See application file for complete search history.

(56) References Cited

U.S. PATENT DOCUMENTS 2,575,478 A   11/1951   Wilson
2,634,375 A    4/1953   Guimbal
(Continued)

FOREIGN PATENT DOCUMENTS

CA    2794150 (A1)    11/2011
CN    1165238 A       11/1997
(Continued)

OTHER PUBLICATIONS

Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.

(Continued)

*Primary Examiner* — Hoang Nguyen
(74) *Attorney, Agent, or Firm* — Edmonds & Nolte, PC

(57) ABSTRACT

Embodiments provide a heat engine system containing working fluid (e.g., sc-$CO_2$) within high and low pressure sides of a working fluid circuit and a heat exchanger configured to transfer thermal energy from a heat source to the working fluid. The heat engine system further contains an expander for converting a pressure drop in the working fluid to mechanical energy, a shaft coupled to the expander and configured to drive a device (e.g., generator or pump) with the mechanical energy, a recuperator for transferring thermal energy between the high and low pressure sides, and a cooler for removing thermal energy from the working fluid in the low pressure side. The heat engine system also contains a pump for circulating the working fluid, a mass management system (MMS) fluidly connected to the working fluid circuit, and a supply tank fluidly connected to the MMS by a supply line.

28 Claims, 20 Drawing Sheets

(56) References Cited

U.S. PATENT DOCUMENTS

| | | |
|---|---|---|
| 2,691,280 A | 10/1954 | Albert |
| 3,095,274 A | 6/1963 | Crawford |
| 3,105,748 A | 10/1963 | Stahl |
| 3,237,403 A | 3/1966 | Feher |
| 3,277,955 A | 10/1966 | Heller |
| 3,401,277 A | 9/1968 | Larson |
| 3,622,767 A | 11/1971 | Koepcke |
| 3,630,022 A | 12/1971 | Jubb |
| 3,736,745 A | 6/1973 | Karig |
| 3,772,879 A | 11/1973 | Engdahl |
| 3,791,137 A | 2/1974 | Jubb |
| 3,830,062 A | 8/1974 | Morgan et al. |
| 3,939,328 A | 2/1976 | Davis |
| 3,971,211 A | 7/1976 | Wethe |
| 3,982,379 A | 9/1976 | Gilli |
| 3,998,058 A | 12/1976 | Park |
| 4,009,575 A | 3/1977 | Hartman, Jr. |
| 4,029,255 A | 6/1977 | Heiser |
| 4,030,312 A | 6/1977 | Wallin |
| 4,049,407 A | 9/1977 | Bottum |
| 4,070,870 A | 1/1978 | Bahel |
| 4,099,381 A | 7/1978 | Rappoport |
| 4,119,140 A | 10/1978 | Cates |
| 4,150,547 A | 4/1979 | Hobson |
| 4,152,901 A | 5/1979 | Munters |
| 4,164,848 A | 8/1979 | Gilli |
| 4,164,849 A | 8/1979 | Mangus |
| 4,170,435 A | 10/1979 | Swearingen |
| 4,182,960 A | 1/1980 | Reuyl |
| 4,183,220 A | 1/1980 | Shaw |
| 4,198,827 A | 4/1980 | Terry et al. |
| 4,208,882 A | 6/1980 | Lopes |
| 4,221,185 A | 9/1980 | Scholes |
| 4,233,085 A | 11/1980 | Roderick |
| 4,236,869 A | 12/1980 | Laurello |
| 4,248,049 A | 2/1981 | Briley |
| 4,257,232 A | 3/1981 | Bell |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,372,125 A | 2/1983 | Dickenson |
| 4,384,568 A | 5/1983 | Palmatier |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,516,403 A | 5/1985 | Tanaka |
| 4,538,960 A | 9/1985 | Iino et al. |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,674,297 A | 6/1987 | Vobach |
| 4,694,189 A | 9/1987 | Haraguchi |
| 4,697,981 A | 10/1987 | Brown et al. |
| 4,700,543 A | 10/1987 | Krieger |
| 4,730,977 A | 3/1988 | Haaser |
| 4,756,162 A | 7/1988 | Dayan |
| 4,765,143 A | 8/1988 | Crawford |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,867,633 A | 9/1989 | Gravelle |
| 4,892,459 A | 1/1990 | Guelich |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,083,425 A | 1/1992 | Hendriks et al. |
| 5,098,194 A | 3/1992 | Kuo |
| 5,102,295 A | 4/1992 | Pope |
| 5,104,284 A | 4/1992 | Hustak, Jr. |
| 5,164,020 A | 11/1992 | Wagner |
| 5,176,321 A | 1/1993 | Doherty |
| 5,203,159 A | 4/1993 | Koizumi et al. |
| 5,228,310 A | 7/1993 | Vandenberg |
| 5,291,960 A | 3/1994 | Brandenburg |
| 5,320,482 A | 6/1994 | Palmer et al. |
| 5,335,510 A | 8/1994 | Rockenfeller |
| 5,358,378 A | 10/1994 | Holscher |
| 5,360,057 A | 11/1994 | Rockenfeller |
| 5,392,606 A | 2/1995 | Labinov |
| 5,440,882 A | 8/1995 | Kalina |
| 5,444,972 A | 8/1995 | Moore |
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,570,578 A | 11/1996 | Saujet |
| 5,588,298 A | 12/1996 | Kalina |
| 5,600,967 A | 2/1997 | Meckler |
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,738,164 A | 4/1998 | Hildebrand |
| 5,754,613 A | 5/1998 | Hashiguchi |
| 5,771,700 A | 6/1998 | Cochran |
| 5,789,822 A | 8/1998 | Calistrat |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,894,836 A | 4/1999 | Wu |
| 5,899,067 A | 5/1999 | Hageman |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,973,050 A | 10/1999 | Johnson |
| 6,037,683 A | 3/2000 | Lulay |
| 6,041,604 A | 3/2000 | Nicodemus |
| 6,058,930 A | 5/2000 | Shingleton |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,282,900 B1 | 9/2001 | Bell |
| 6,282,917 B1 | 9/2001 | Mongan |
| 6,295,818 B1 | 10/2001 | Ansley |
| 6,299,690 B1 | 10/2001 | Mongeon |
| 6,341,781 B1 | 1/2002 | Matz |
| 6,374,630 B1 | 4/2002 | Jones |
| 6,393,851 B1 | 5/2002 | Wightman |

(56) References Cited

U.S. PATENT DOCUMENTS

| | | |
|---|---|---|
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,539,720 B2 | 4/2003 | Rouse et al. |
| 6,539,728 B2 | 4/2003 | Korin |
| 6,571,548 B1 | 6/2003 | Bronicki |
| 6,581,384 B1 | 6/2003 | Benson |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan et al. |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,533 B2 | 4/2006 | Lewis-Aburn et al. |
| 7,033,553 B2 | 4/2006 | Johnston et al. |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,972,529 B2 | 7/2011 | Machado |
| 7,997,076 B2 | 8/2011 | Ernst |
| 8,096,128 B2 * | 1/2012 | Held et al. ............... 60/645 |
| 8,099,198 B2 | 1/2012 | Gurin |
| 8,146,360 B2 | 4/2012 | Myers |
| 8,281,593 B2 * | 10/2012 | Held et al. ............... 60/659 |
| 8,419,936 B2 | 4/2013 | Berger et al. |
| 2001/0015061 A1 | 8/2001 | Viteri et al. |
| 2001/0020444 A1 | 9/2001 | Johnston |
| 2001/0030952 A1 | 10/2001 | Roy |
| 2002/0029558 A1 | 3/2002 | Tamaro |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2005/0022963 A1 | 2/2005 | Garrabrant et al. |
| 2005/0056001 A1 | 3/2005 | Frutschi |
| 2005/0096676 A1 | 5/2005 | Gifford, III et al. |
| 2005/0109387 A1 | 5/2005 | Marshall |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0017192 A1 | 1/2007 | Bednarek et al. |
| 2007/0019708 A1 | 1/2007 | Shiflett et al. |

(56) References Cited

U.S. PATENT DOCUMENTS

| | | |
|---|---|---|
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0135253 A1 | 6/2008 | Vinegar et al. |
| 2008/0163625 A1 | 7/2008 | O'Brien |
| 2008/0173450 A1 | 7/2008 | Goldberg et al. |
| 2008/0211230 A1 | 9/2008 | Gurin |
| 2008/0250789 A1 | 10/2008 | Myers et al. |
| 2008/0252078 A1 | 10/2008 | Myers |
| 2009/0021251 A1 | 1/2009 | Simon |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0180903 A1 | 7/2009 | Martin et al. |
| 2009/0205892 A1 | 8/2009 | Jensen et al. |
| 2009/0211251 A1 | 8/2009 | Petersen et al. |
| 2009/0211253 A1 | 8/2009 | Radcliff et al. |
| 2009/0266075 A1 | 10/2009 | Westmeier et al. |
| 2009/0293503 A1 | 12/2009 | Vandor |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287934 A1 | 11/2010 | Glynn et al. |
| 2010/0300093 A1 | 12/2010 | Doty |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopacek et al. |
| 2011/0259010 A1 | 10/2011 | Bronicki et al. |
| 2011/0299972 A1 | 12/2011 | Morris |
| 2011/0308253 A1 | 12/2011 | Ritter |
| 2012/0047892 A1 | 3/2012 | Held et al. |
| 2012/0067055 A1 | 3/2012 | Held |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0174558 A1 | 7/2012 | Gurin |
| 2012/0186219 A1 | 7/2012 | Gurin |
| 2012/0247134 A1 | 10/2012 | Gurin |
| 2012/0247455 A1 | 10/2012 | Gurin et al. |
| 2012/0261090 A1 | 10/2012 | Durmaz et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0113221 A1 | 5/2013 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 19906087 (A1) | 8/2000 |
| DE | 10052993 (A1) | 5/2002 |
| EP | 1977174 (A2) | 10/2008 |
| EP | 1998013 A2 | 12/2008 |
| EP | 2419621 (A1) | 2/2012 |
| EP | 2446122 (A1) | 5/2012 |
| EP | 2478201 (A1) | 7/2012 |
| EP | 2500530 (A1) | 9/2012 |
| EP | 2550436 (A0) | 1/2013 |
| GB | 856985 (A) | 12/1960 |
| GB | 2010974 A | 7/1979 |
| GB | 2075608 (A) | 11/1981 |
| JP | 58-193051 (A) | 11/1983 |
| JP | 60040707 A | 3/1985 |
| JP | 61-152914 (A) | 7/1986 |
| JP | 01-240705 (A) | 9/1989 |
| JP | 05-321612 (A) | 12/1993 |
| JP | 06-331225 (A) | 11/1994 |
| JP | 08028805 A | 2/1996 |
| JP | 09-100702 (A) | 4/1997 |
| JP | 2641581 (B2) | 5/1997 |
| JP | 09-209716 (A) | 8/1997 |
| JP | 2858750 (B2) | 12/1998 |
| JP | H11270352 | 5/1999 |
| JP | 2000257407 A | 9/2000 |
| JP | 2001-193419 (A) | 7/2001 |
| JP | 2002-097965 (A) | 4/2002 |
| JP | 2003529715 A | 10/2003 |
| JP | 2004-239250 (A) | 8/2004 |
| JP | 2004-332626 (A) | 11/2004 |
| JP | 2005030727 A | 2/2005 |
| JP | 2005-533972 (A1) | 11/2005 |
| JP | 2006037760 A | 2/2006 |
| JP | 2006177266 A | 7/2006 |
| JP | 2007-198200 (A) | 9/2007 |
| JP | 4343738 (B2) | 10/2009 |
| JP | 2011-017268 (A) | 1/2011 |
| KR | 100191080 | 6/1999 |
| KR | 10-2007-0086244 (A) | 8/2007 |
| KR | 10-0766101 (B1) | 10/2007 |
| KR | 10-0844634(A) | 7/2008 |
| KR | 10-20100067927 (A) | 6/2010 |
| KR | 1020110018769 (A) | 2/2011 |
| KR | 1069914 (B1) | 9/2011 |
| KR | 1103549 (B1) | 1/2012 |
| KR | 10-2012-0058582 (A) | 6/2012 |
| KR | 2012-0068670 | 6/2012 |
| KR | 2012-0128753 (A) | 11/2012 |
| KR | 2012-0128755 (A) | 11/2012 |
| WO | WO 91/05145 (A1) | 4/1991 |
| WO | WO 96/09500 (A1) | 3/1996 |
| WO | 0071944 A1 | 11/2000 |
| WO | WO 01/44658 | 6/2001 |
| WO | WO 2006/060253 | 6/2006 |

(56) References Cited

FOREIGN PATENT DOCUMENTS

| WO | WO 2006/137957 (A1) | 12/2006 |
|---|---|---|
| WO | WO 2007/056241 (A2) | 5/2007 |
| WO | WO 2007/079245 (A2) | 7/2007 |
| WO | WO 2007/082103 (A2) | 7/2007 |
| WO | WO 2007/112090 (A2) | 10/2007 |
| WO | WO 2008/039725 (A2) | 4/2008 |
| WO | 2008101711 A2 | 8/2008 |
| WO | WO 2009/045196(A1) | 4/2009 |
| WO | WO 2009/058992 (A2) | 5/2009 |
| WO | 2010083198 A1 | 7/2010 |
| WO | WO 2010/074173 (A1) | 7/2010 |
| WO | WO 2010/121255 (A1) | 10/2010 |
| WO | WO 2010/126980 (A2) | 11/2010 |
| WO | WO 2010/151560 (A1) | 12/2010 |
| WO | WO 2011/017450 (A2) | 2/2011 |
| WO | WO 2011/017476 (A1) | 2/2011 |
| WO | WO 2011/017599 (A1) | 2/2011 |
| WO | WO 2011/034984 (A1) | 3/2011 |
| WO | WO 2011/094294 (A2) | 8/2011 |
| WO | WO 2011/119650 (A2) | 9/2011 |
| WO | WO 2012/074905(A2) | 6/2012 |
| WO | WO 2012/074907(A2) | 6/2012 |
| WO | WO 2012/074911(A2) | 6/2012 |
| WO | WO 2012/074940 (A2) | 6/2012 |
| WO | WO 2013/055391 (A1) | 4/2013 |
| WO | WO 2013/059687 (A1) | 4/2013 |
| WO | WO 2013/059695 (A1) | 4/2013 |
| WO | WO 2013/070249 (A1) | 5/2013 |
| WO | WO 2013/074907 (A1) | 5/2013 |

OTHER PUBLICATIONS

Angelino, G., and Invernizzi, C.M., "Carbon Dioxide Power Cycles using Liquid Natural Gas as Heat Sink", Applied Thermal Engineering Mar. 3, 2009, 43 pages.
Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.
Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.
Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.
Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.
Chen, Yang, "Thermodynamic Cycles Using Carbon Dioxide as Working Fluid", Doctoral Thesis, School of Industrial Engineering and Management, Stockholm, Oct. 2011, 150 pages., (3 parts).
Chordia, Lalit, "Optimizing Equipment for Supercritical Applications", Thar Energy LLC, Supercritical CO2 Power Cycle Symposium, May 24-25, 2011, Boulder, CO, 7 pages.
Combs, Osie V., "An Investigation of the Supercritical CO2 Cycle (Feher cycle) for Shipboard Application", Massachusetts Institute of Technology, May 1977, 290 pages.
Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.
Dostal, V., et al., A Supercritical Carbon Dioxide Cycle for Next Generation Nuclear Reactors, Mar. 10, 2004, 326 pages., (7 parts).
Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.
Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.
Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.
Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.
Feher, E.G., et al., "Investigation of Supercritical (Feher) Cycle", Astropower Laboratory, Missile & Space Systems Division, Oct. 1968, 152 pages.
Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.
Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.
Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.
Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.
Hejzlar, P. et al., "Assessment of Gas Cooled Gas Reactor with Indirect Supercritical CO2 Cycle" Massachusetts Institute of Technology, Jan. 2006, 10 pages.
Hoffman, John R., and Feher, E.G., "150 kwe Supercritical Closed Cycle System", Transactions of the ASME, Jan. 1971, pp. 70-80.
Jeong, Woo Seok, et al., "Performance of S-CO2 Brayton Cycle with Additive Gases for SFR Application", Korea Advanced Institute of Science and Technology, Supercritical CO2 Power Cycle Symposium, May 24-25, 2011, Boulder, CO, 5 pages.
Johnson, Gregory A., & McDowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.
Kawakubo, Tomoki, "Unsteady Roto-Stator Interaction of a Radial-Inflow Turbine with Variable Nozzle Vanes", ASME Turbo Expo

(56) References Cited

OTHER PUBLICATIONS

2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).
Kulhanek, Martin, "Thermodynamic Analysis and Comparison of S-CO2 Cycles", Presentation, Czech Technical University in Prague, Supercritical CO2 Power Cycle Symposium, May 24-25, 2011, Boulder, CO, 14 pages.
Kulhanek, Martin, "Thermodynamic Analysis and Comparison of S-CO2 Cycles", Paper, Czech Technical University in Prague, Supercritical CO2 Power Cycle Symposium, May 24-25, 2011, Boulder, CO, 7 pages.
Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.
Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.
Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.
Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.
Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.
Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.
Muto, Yasushi, and Kato, Yasuyoshi, "Optimal Cycle Scheme of Direct Cycle Supercritical CO2 Gas Turbine for Nuclear Power Generation Systems", International Conference on Power Engineering—2007, Oct. 23-27, 2007, Hangzhou, China, pp. 86-87.
Noriega, Bahamonde J.S., "Design Method for s-CO2 Gas Turbine Power Plants", Master of Science Thesis, Delft University of Technology, Oct. 2012, 122 pages., (3 parts).
Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, Ed, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.
Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.
PCT/US2006/049623 (EPS-020PCT)—Written Opinion of ISA dated Jan. 4, 2008, 4 pages.
PCT/US2007/001120 (EPS-019PCT)—International Search Report dated Apr. 25, 2008, 7 pages.
PCT/US2007/079318 (EPS-021PCT)—International Preliminary Report on Patentability dated Jul. 7, 2008, 5 pages.
PCT/US2010/031614 (EPS-014)—International Search Report dated Jul. 12, 2010, 3 pages.
PCT/US2010/031614—(EPS-14)—International Preliminary Report on Patentability dated Oct. 27, 2011, 9 pages.
PCT/US2010/039559 (EPS-015)—International Preliminary Report on Patentability dated Jan. 12, 2012, 7 pages.
PCT/US2010/039559 (EPS-015)—Notification of Transmittal of the International Search Report and Written Opinion of the International Searching Authority, or the Declaration dated Sep. 1, 2010, 6 pages.
PCT/US2010/044476(EPS-018)—International Search Report dated Sep. 29, 2010, 23 pages.
PCT/US2010/044681 (EPS016)—International Search Report and Written Opinion mailed Oct. 7, 2010, 10 pages.
PCT/US2010/044681(EPS-016)—International Preliminary Report on Patentability dated Feb. 16, 2012, 9 pages.
PCT/US2010/049042 (EPS-008)—International Search Report and Written Opinion dated Nov. 17, 2010, 11 pages.
PCT/US2010/049042 (EPS-008)—International Preliminary Report on Patentability dated Mar. 29, 2012, 18 pages.
PCT/US2011/029486 (EPS-002)—International Preliminary Report on Patentability dated Sep. 25, 2012, 6 pages.
PCT/US2011/029486 (EPS-002)—International Search Report and Written Opinion dated Nov. 16, 2011, 9 pages.
PCT/US2011/062266 (EPS-069)—International Search Report and Written Opinion dated Jul. 9, 2012, 12 pages.
PCT/US2011/062198 (EPS-070)—International Search Report and Written Opinion dated Jul. 2, 2012, 9 pages.
PCT/US2011/062201 (EPS-071)—International Search Report and Written Opinion dated Jun. 26, 2012, 9 pages.
PCT/US2011/062204 (EPS-072)—International Search Report dated Nov. 1, 2012, 10 pages.
PCT/US2011/62207 (EPS-073)—International Search Report and Written Opinion dated Jun. 28, 2012, 7 pages.
PCT/US2012/000470 (EPS-124)—International Search Report dated Mar. 8, 2013, 10 pages.
PCT/US2012/061151 (EPS-125)—International Search Report and Written Opinion dated Feb. 25, 2013, 9 pages.
PCT/US2012/061159 (EPS-126)—International Search Report dated Mar. 2, 2013, 10 pages.
Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.
Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.
San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.
Sarkar, J., and Bhattacharyya, Souvik, "Optimization of Recompression S-CO2 Power Cycle with Reheating" Energy Conversion and Management 50 (May 17, 2009), pp. 1939-1945.
Tom, Samsun Kwok Sun, "The Feasibility of Using Supercritical Carbon Dioxide as a Coolant for the Candu Reactor", The University of British Columbia, Jan. 1978, 156 pages.
VGB PowerTech Service GmbH, "CO2 Capture and Storage", a VGB Report on the State of the Art, Aug. 25, 2004, 112 pages.
Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.
Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.
Wright, Steven A., et al., "Modeling and Experimental Results for Condensing Supercritical CO2 Power Cycles", Sandia Report, Jan. 2011, 47 pages.
Wright, Steven A., et al., "Supercritical CO2 Power Cycle Development Summary at Sandia National Laboratories", May 24-25, 2011, (1 page, Abstract only).
Wright, Steven, "Mighty Mite", Mechanical Engineering, Jan. 2012, pp. 41-43.

(56) References Cited

OTHER PUBLICATIONS

Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.

Yoon, Ho Joon, et al., "Preliminary Results of Optimal Pressure Ratio for Supercritical CO2 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.

CN Search Report for Application No. 201080035382.1, 2 pages.

CN Search Report for Application No. 201080050795.7, 2 pages.

PCT/US2011/062198—Extended European Search Report dated May 6, 2014, 9 pages.

PCT/US2011/062201—Extended European Search Report dated May 28, 2014, 8 pages.

PCT/US2013/055547—Notification of Transmittal of the International Search Report and the Written Opinion of the International Searching Authority, or the Declaration dated Jan. 24, 2014, 11 pages.

PCT/US2013/064470—Notification of Transmittal of the International Search Report and the Written Opinion of the International Searching Authority, or the Declaration dated Jan. 22, 2014, 10 pages.

PCT/US2013/064471—Notification of Transmittal of the International Search Report and the Written Opinion of the International Searching Authority, or the Declaration dated Jan. 24, 2014, 10 pages.

PCT/US2014/013154—International Search Report dated May 23, 2014, 4 pages.

PCT/US2014/013170—Notification of Transmittal of the International Search Report and the Written Opinion of the International Searching Authority, or the Declaration dated May 9, 2014, 12 pages.

PCT/US2014/023026—Notification of Transmittal of the International Search Report and the Written Opinion of the International Searching Authority, or the Declaration dated Jul. 22, 2014, 11 pages.

PCT/US2014/023990—Notification of Transmittal of the International Search Report and the Written Opinion of the International Searching Authority, or the Declaration dated Jul. 17, 2014, 10 pages.

PCT/US2014/026173—Notification of Transmittal of the International Search Report and the Written Opinion of the International Searching Authority, or the Declaration dated Jul. 9, 2014, 10 pages.

Renz, Manfred, "The New Generation Kalina Cycle", Contribution to the Conference: "Electricity Generation from Enhanced Geothermal Systems", Sep. 14, 2006, Strasbourg, France, 18 pages.

Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.

* cited by examiner

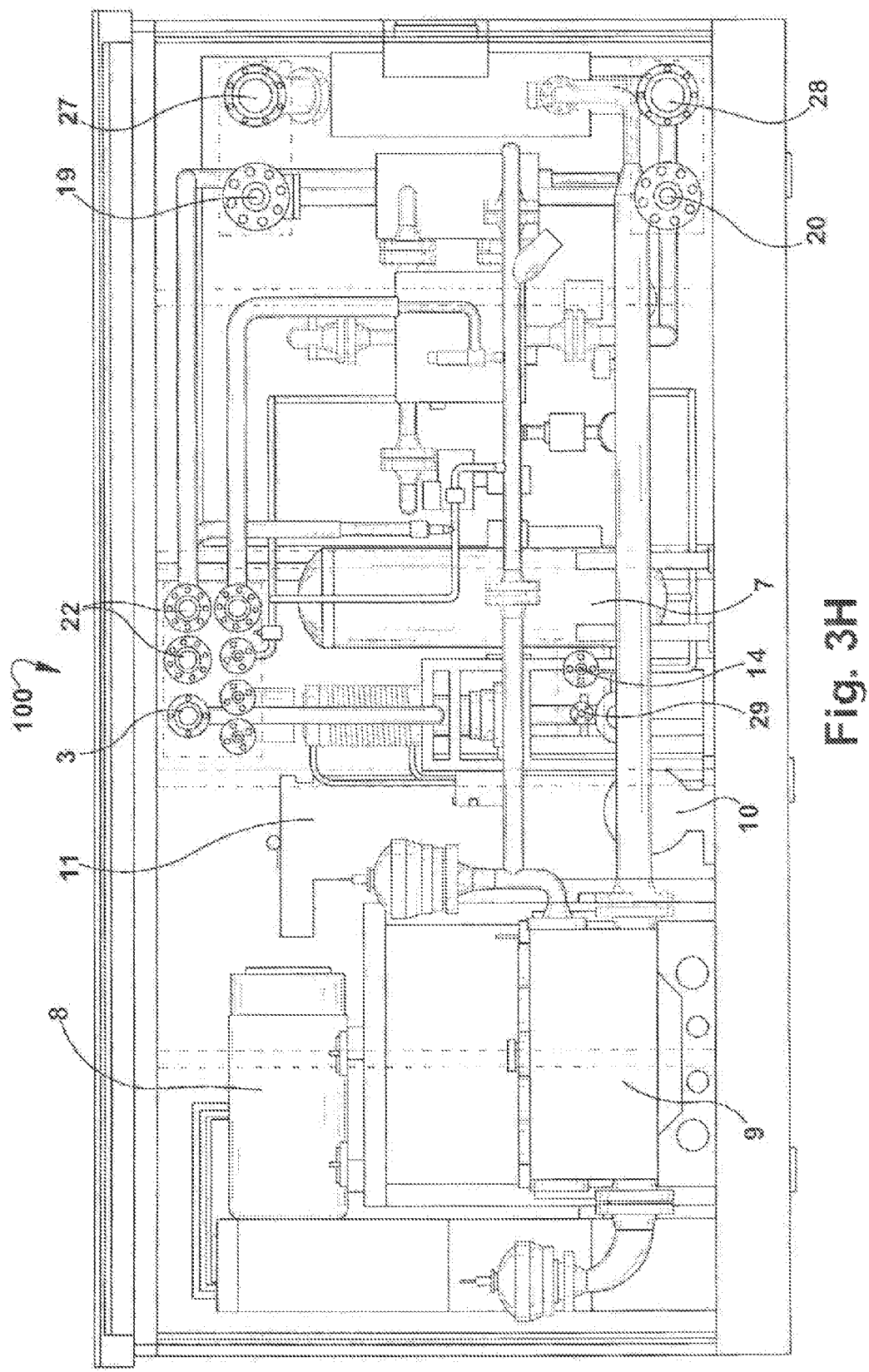

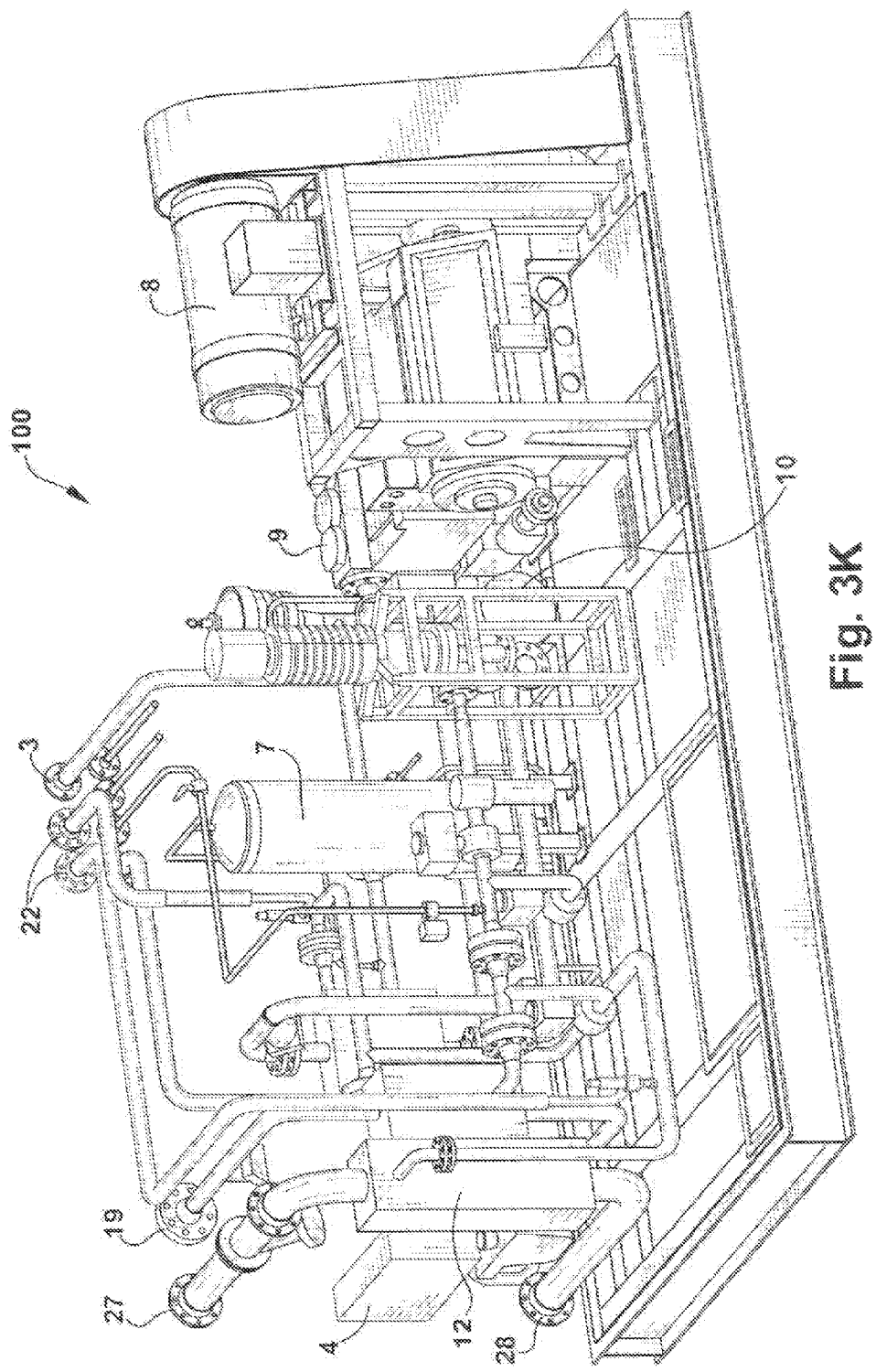

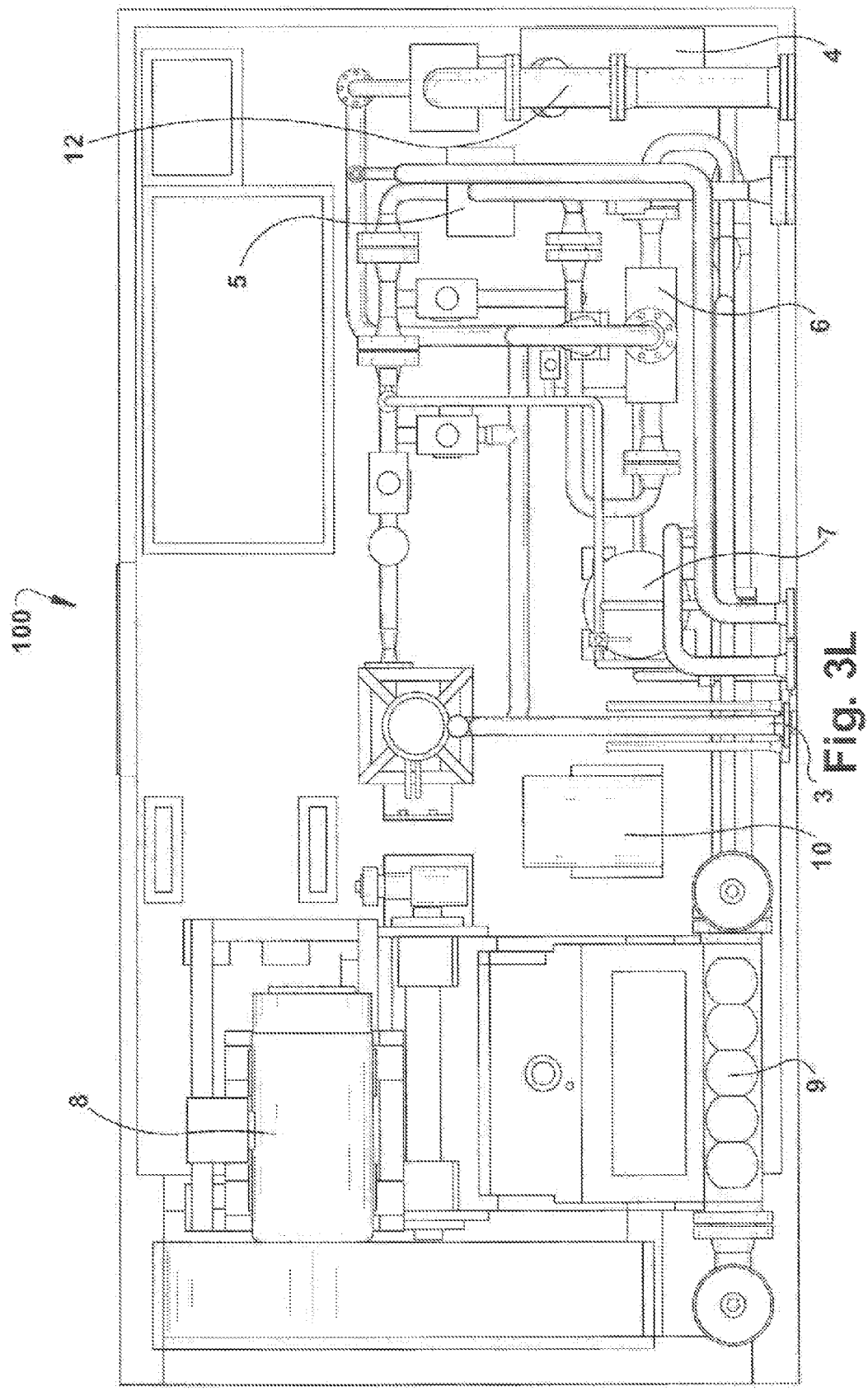

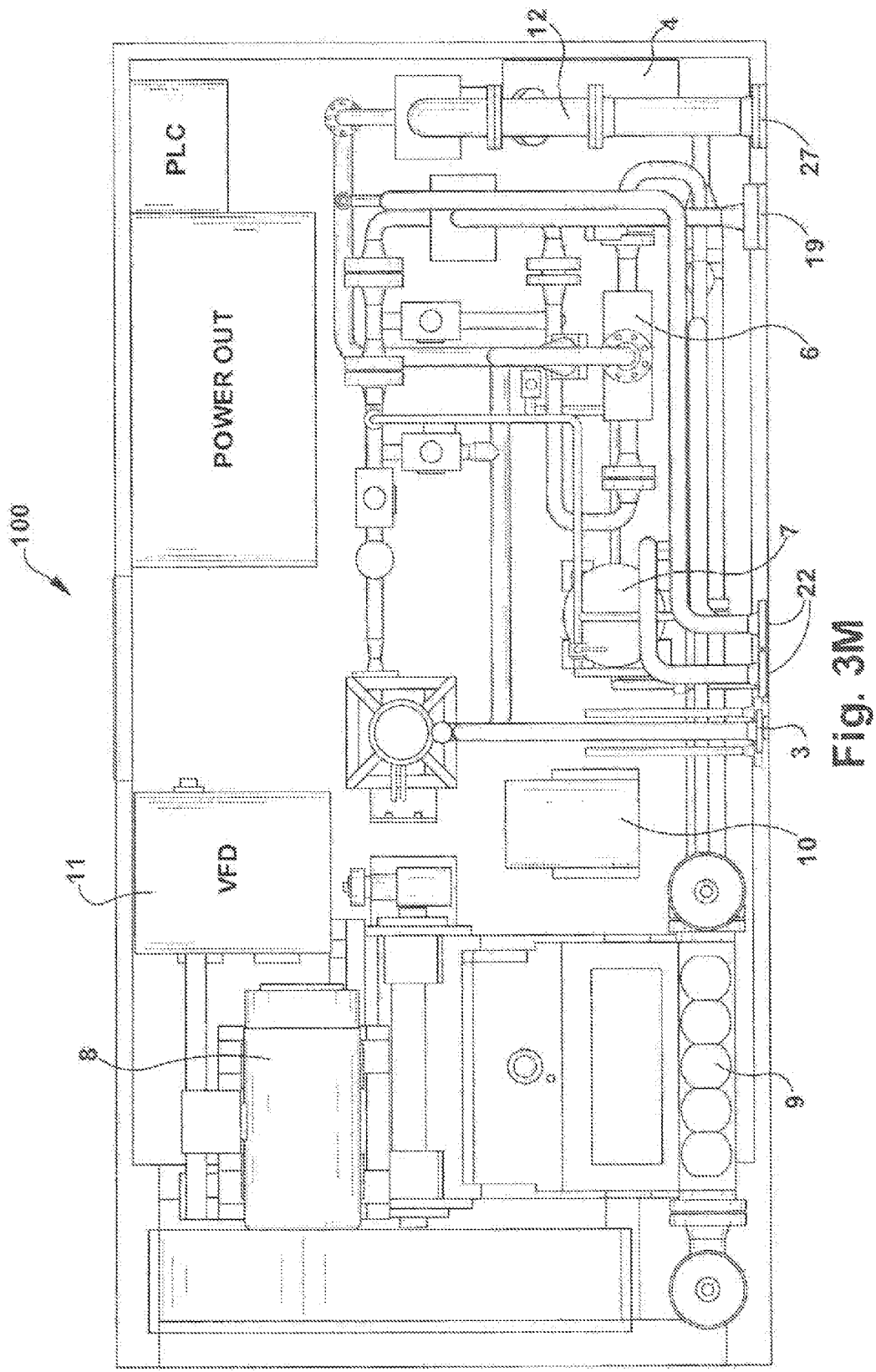

HEAT ENGINE AND HEAT TO ELECTRICITY SYSTEMS AND METHODS FOR WORKING FLUID FILL SYSTEM

CROSS-REFERENCE TO RELATED APPLICATIONS

This application is a continuation of U.S. application Ser. No. 12/880,428, filed Sep. 13, 2010, and issued as U.S. Pat. No. 8,281,593, which is a continuation-in-part of U.S. application Ser. No. 12/631,379, filed Dec. 4, 2009, and issued as U.S. Pat. No. 8,096,128, which claims the benefit of U.S. Appl. No. 61/243,200, filed Sep. 17, 2009, which are incorporated herein by reference.

FIELD OF THE INVENTION

This disclosure and the related inventions are in the general field of thermodynamics and energy conversion systems and methods.

BACKGROUND

Heat is often created as a byproduct of industrial processes where flowing streams of liquids, solids or gasses that contain heat must be exhausted into the environment or removed in some way in an effort to maintain the operating temperatures of the industrial process equipment. Sometimes the industrial process can use heat exchanger devices to capture the heat and recycle it back into the process via other process streams. Other times it is not feasible to capture and recycle this heat because it is either too high in temperature or it may contain insufficient mass flow. This heat is referred to as "waste" heat. Waste heat is typically discharged directly into the environment or indirectly through a cooling medium, such as water.

Waste heat can be utilized by turbine generator systems which employ a well known thermodynamic method known as the Rankine cycle to convert heat into work. Typically, this method is steam-based, wherein the waste heat is used to create steam in a boiler to drive a turbine. The steam-based Rankine cycle is not always practical because it requires heat source streams that are relatively high in temperature (600° F. or greater) or are large in overall heat content. The complexity of boiling water at multiple pressures/temperatures to capture heat at multiple temperature levels as the heat source stream is cooled, is costly in both equipment cost and operating labor. The steam-based Rankine cycle is not a realistic option for streams of small flow rate and/or low temperature.

There exists a need in the art for a system that can efficiently and effectively produce power from not only waste heat but also from a wide range of thermal sources.

SUMMARY

A waste heat recovery system executes a thermodynamic cycle using a working fluid in a working fluid circuit which has a high pressure side and a low pressure side. Components of the system in the working fluid circuit include a waste heat exchanger in thermal communication with a waste heat source also connected to the working fluid circuit, whereby thermal energy is transferred from the waste heat source to the working fluid in the working fluid circuit, an expander located between the high pressure side and the low pressure side of the working fluid circuit, the expander operative to convert a pressure/enthalpy drop in the working fluid to mechanical energy, a recuperator in the working fluid circuit operative to transfer thermal energy between the high pressure side and the low pressure side of the working fluid circuit, a cooler in thermal communication with the low pressure side of the working fluid circuit operative to control temperature of the working fluid in the low side of the working fluid circuit, a pump in the working fluid circuit and connected to the low pressure side and to the high pressure side of the working fluid circuit and operative to move the working fluid through the working fluid circuit, and a mass management system connected to the working fluid circuit, the mass management system having a working fluid vessel connected to the low pressure side of the working fluid circuit.

The disclosure and related inventions further address the need to fill a waste heat recovery or heat engine system having a mass management system with working fluid by providing a fill system that fills the mass management system of the heat engine system with working fluid. The inventive fill system comprises a fill storage tank (vessel) which in one embodiment is not in direct fluid communication with the circulation loop of the heat engine system; rather the storage tank is in direct fluid communication with a mass management system of the heat engine system and most preferably the mass control tank (also referred to herein as a mass management tank) or working fluid vessel of the mass management system.

In a preferred embodiment, the fill storage tank is capable of storing working fluid at a pressure and temperature that is convenient for storage; in the preferred embodiment the working fluid is carbon dioxide and the preferred storage temperature is between 8-24° F. and the preferred storage pressure is between 200-350 psia. The fill system is also comprised of conduit, or "working fluid supply line", suitable for transferring the working fluid between the fill storage tank and the mass management system's mass control tank and one or more valves in fluid communication with such conduit to regulate the flow of mass between the two storage tanks.

The inventive fill system moves working fluid from the fill storage tank to the mass management system by utilizing a pressure differential between working fluid in the fill storage tank (vessel), in a preferred embodiment this vessel may be a Dewar D or bulk storage tank, and the working fluid in the mass control tank. In the inventive system, this pressure differential drives working fluid into the mass control tank. Also, as further described a pump may be provided in the conduit extending between the fill storage tank and the mass control tank which enables movement of working fluid against the pressure differential.

In a preferred embodiment, the mass storage tank for the mass management system further includes a means (such as but not limited to a thermocouple) for measuring the temperature of the working fluid within the mass storage tank at both the tank inlet near the bottom of the tank and at the top of the tank in order to measure when the tank is full and control instrumentation that communicates with the one or more valves between the fill storage tank and the mass management storage tank. The mass storage tank further includes a means for measuring the fill height of the working fluid within a mass storage tank (such as but not limited to a dip tube) and control instrumentation that communicates with the mass storage tank and the heat engine system; alternatively, the inventive fill system provides a means for determining how much working fluid moved into the mass management system such as but not limited to a mass reading instrument (e.g., a scale), one or more pressure sensors, or a flow meter.

The mass management storage tank may further include a heat source for applying heat to the stored working fluid and instrumentation in communication with the heat source for regulating the application of heat to the working fluid within mass storage tank.

A waste heat recovery system executes a thermodynamic cycle using a working fluid in a working fluid circuit which has a high pressure side and a low pressure side. Components of the system in the working fluid circuit include a waste heat exchanger in thermal communication with a waste heat source also connected to the working fluid circuit, whereby thermal energy is transferred from the waste heat source to the working fluid in the working fluid circuit, an expander located between the high pressure side and the low pressure side of the working fluid circuit, the expander operative to convert a pressure/enthalpy drop in the working fluid to mechanical energy, a recuperator in the working fluid circuit operative to transfer thermal energy between the high pressure side and the low pressure side of the working fluid circuit, a cooler in thermal communication with the low pressure side of the working fluid circuit operative to control temperature of the working fluid in the low side of the working fluid circuit, a pump in the working fluid circuit and connected to the low pressure side and to the high pressure side of the working fluid circuit and operative to move the working fluid through the working fluid circuit, and a mass management system connected to the working fluid circuit, the mass management system having a working fluid vessel connected to the low pressure side of the working fluid circuit, and a fill system to move working fluid stored in a fill storage tank into and/or out of the mass management system of the cycle.

In one embodiment, a waste heat energy recovery and conversion device includes a working fluid circuit having conduit and components for containing and directing flow of a working fluid between components of the device operative to convert thermal energy into mechanical energy, the working fluid circuit having a high pressure side and a low pressure side; a support structure for supporting the conduit of the working fluid circuit and the components, the components comprising: an expander operative to convert a pressure drop in the working fluid to mechanical energy, a power generator (such as for example an alternator) which is coupled to the expander, a recuperator, a cooler, a pump and a pump motor operative to power the pump; and a mass management system having a mass control tank for receiving and holding the working fluid, the mass control tank connected by conduit to the high pressure side of the working fluid circuit and to the low pressure side of the working fluid circuit. An enclosure may also be provided to substantially enclose some or all of the components of the device. One or more heat exchangers may be located on or off of the support structure. The heat exchanger(s), recuperator and cooler/condenser may include printed circuit heat exchange panels. A control system for controlling operation of the device may be remote or physically packaged with the device.

The disclosure and related inventions further includes a method of converting thermal energy into mechanical energy by use of a working fluid in a closed loop thermodynamic cycle contained in a working fluid circuit having components interconnected by conduit, the components including at least one heat exchanger operative to transfer thermal energy to the working fluid, at least one expansion device operative to convert thermal energy from the working fluid to mechanical energy, at least one pump operative to transfer working fluid through the working fluid circuit, the working fluid circuit having a high pressure side and a low pressure side, and a mass management system comprising a mass management vessel connected by conduit to the low pressure side of the working fluid circuit, the method including the steps of: placing a thermal energy source in thermal communication with a heat exchanger component; pumping the working fluid through the working fluid circuit by operation of the pump to supply working fluid in a supercritical or subcritical state to the expander; directing the working fluid away from the expander in a sub-critical state through the working fluid circuit and to the pump; controlling flow of the working fluid in a super-critical state from the high pressure side of the working fluid circuit to the mass management vessel, and controlling an amount of working fluid in a sub-critical or super-critical state from the mass management vessel to the low pressure side of the working fluid circuit and to the pump.

The disclosure and related inventions further includes a mass management system for controlling an amount of working fluid mass in a thermodynamic cycle in a working fluid circuit having a pump or a compressor, the mass management system having a working fluid control tank for holding an amount of the working fluid at a first pressure P, the working fluid control tank located outside of the working fluid circuit; and a fluid connection between the working fluid control tank and a low pressure side of the thermodynamic cycle in the working fluid circuit to allow passage of the working fluid between the working fluid circuit and the working fluid control tank.

These and other aspects of the disclosure and related inventions are further described below in representative forms with reference to the accompanying drawings.

BRIEF DESCRIPTION OF THE DRAWINGS

FIGS. 3A-3M are schematic drawings of a representative embodiment of a heat engine device and heat engine skid of the present disclosure and related inventions;

DETAILED DESCRIPTION

Figure 1:
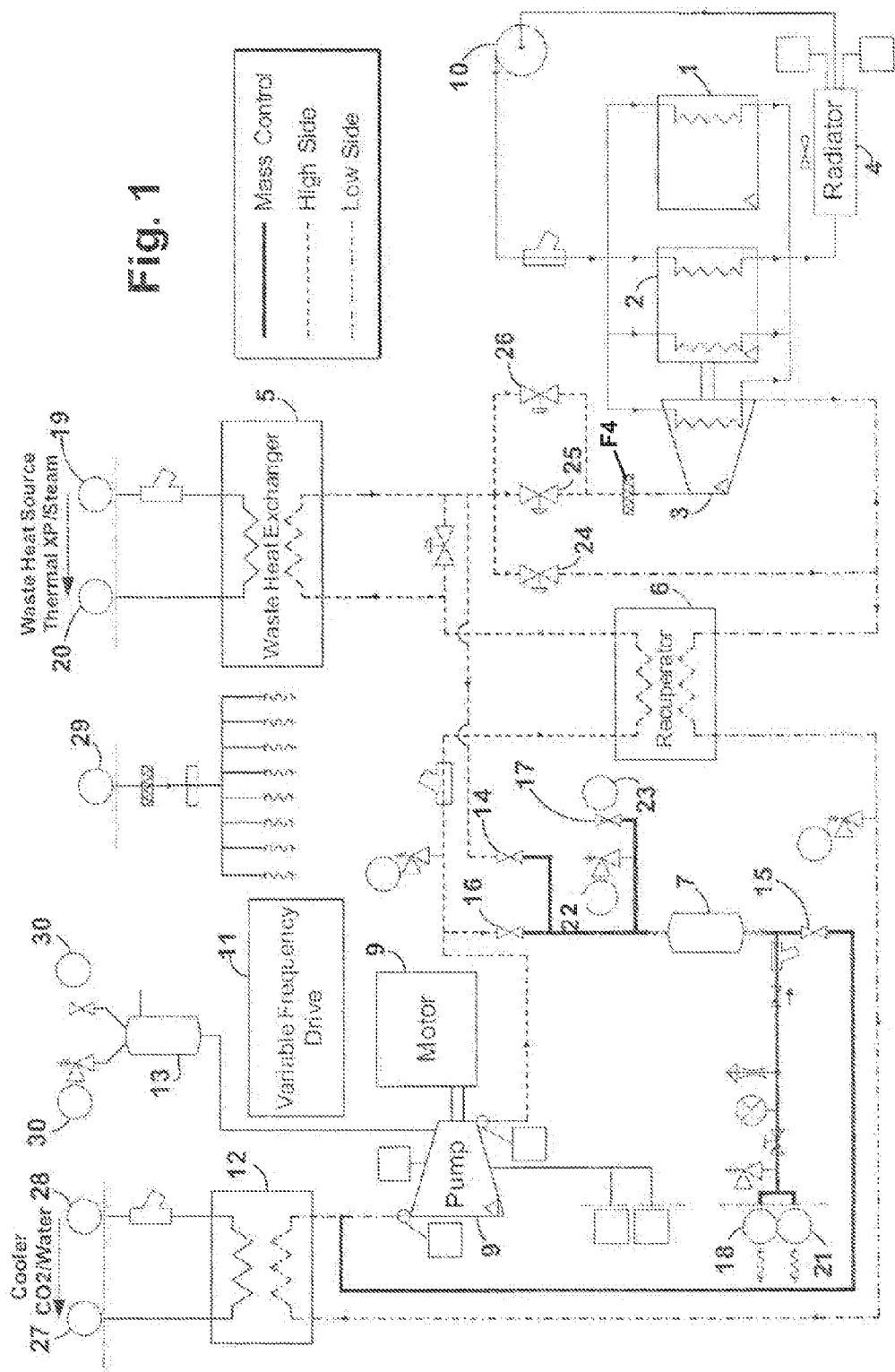
FIG. 1 is a schematic diagram of the heat to electricity system of the present invention.

The inventive heat engine system 100 (also referred to herein in the alternative as a "thermal engine", "power generation device", "waste heat recovery system" and "heat recovery system", "heat to electricity system") of the present disclosure utilizes a thermodynamic cycle which has elements of the Rankine thermodynamic cycle in combination with selected working fluid(s), such as carbon dioxide, to produce power from a wide range of thermal sources, as illustrated in FIG. 1. By "thermal engine" or "heat engine" what is generally referred to is the equipment set that executes the thermodynamic cycle described herein; by "heat recovery system" what is generally referred to is the thermal engine in cooperation with other equipment to deliver heat (from any source) to and remove heat from the inventive thermal engine.

The thermodynamic cycle executed by the heat engine system 100 is described with reference to a pressure-enthalpy diagram for a selected working fluid, FIG. 2. The thermodynamic cycle is designed to operate as a closed loop thermodynamic cycle in a working fluid circuit having a flow path defined by conduit which interconnects components of the working fluid circuit. The thermal engine which operates the cycle may or may not be hermetically or otherwise entirely sealed (such that no amount of working fluid is leaked from the system into the surrounding environment).

Figure 2:
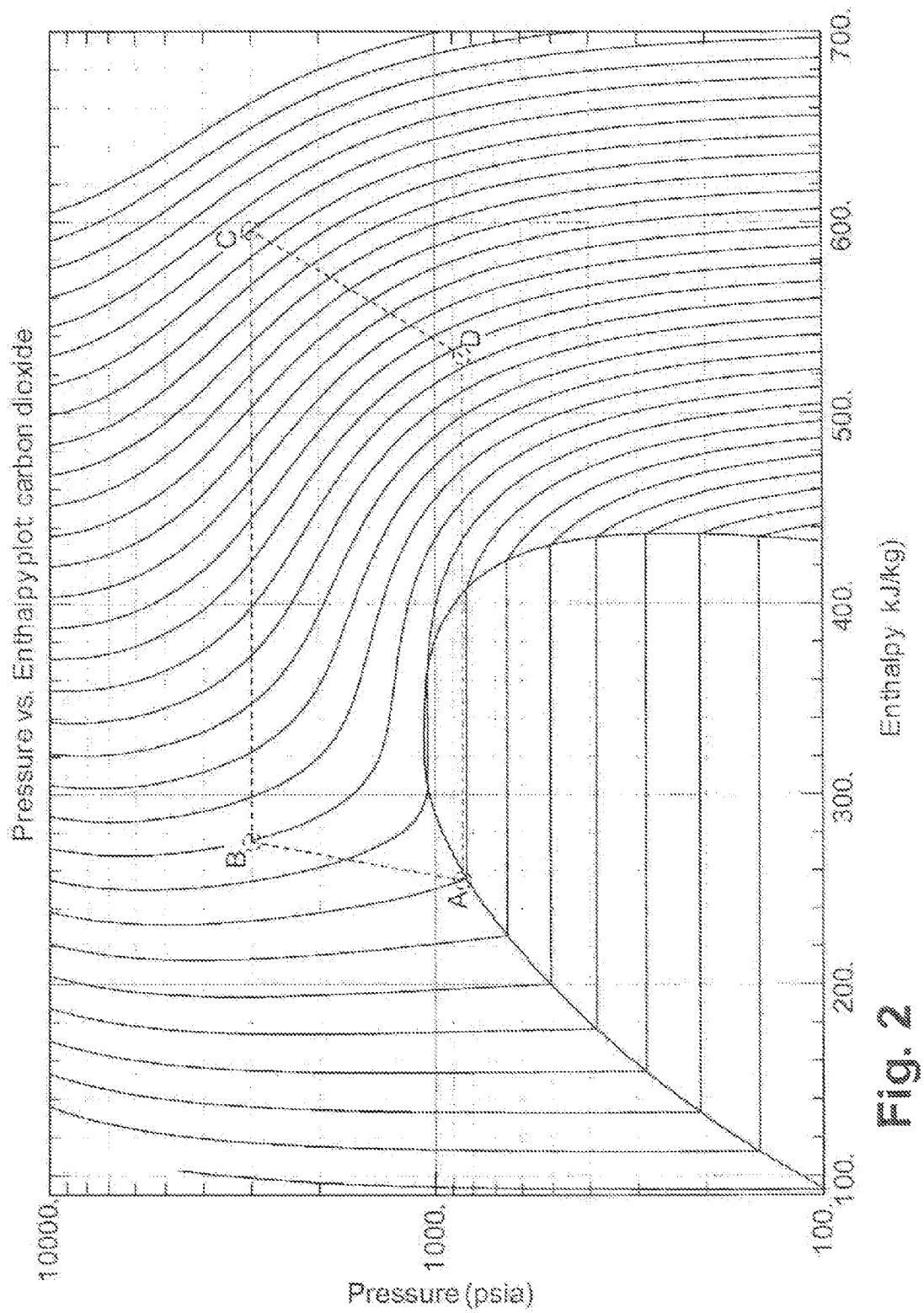
FIG. 2 is a pressure-enthalpy diagram for carbon dioxide.

The thermodynamic cycle that is executed by the thermal engine is shown in its most rudimentary form in FIG. 2 which is a pressure-enthalpy diagram for carbon dioxide. The thermodynamic cycle may be described for ease of understanding by referencing a working fluid at point A on this diagram. At this point, the working fluid has its lowest pressure and lowest enthalpy relative to its state at any other point during the cycle and as shown on the diagram. From there, the working fluid is compressed and/or pumped to a higher pressure (point B on the diagram). From there, thermal energy is introduced to the working fluid which both increases the temperature of the working fluid and increases the enthalpy of the working fluid (point C on the diagram). The working fluid is then expanded through a mechanical process to point (D). From there, the working fluid discharges heat, dropping in both temperature and enthalpy, until it returns to point (A). Each process (e.g., A-B, B-C, C-D, D-A) need not occur as shown on the exemplary diagram and one of ordinary skill in the art would recognize that each step of the cycle could be achieved in a variety of ways and/or that it is possible to achieve a variety of different coordinates on the diagram. Similarly, each point on the diagram may vary dynamically over time as variables within and external to the system change, e.g., ambient temperature, waste heat temperature, amount of mass in the system.

In the preferred embodiment of the thermal engine, the cycle is executed during normal, steady state operation such that the low pressure side of the system (points A and D on FIG. 2) is between 400 psia and 1,500 psia and the high pressure side of the system is between 2,500 psia and 4,500 psia (points B and C FIG. 2). One of ordinary skill in the art would recognize that either or both higher or lower pressures could be selected for each or all points. In the preferred embodiment of the cycle, it will be observed that between points C and D, the working fluid transitions from a supercritical state to a subcritical state (e.g., a transcritical cycle); one of ordinary skill in the art would recognize that the pressures at points C and D could be selected such that the working fluid remained in a supercritical state during the entire cycle.

In a preferred embodiment of the thermal engine, the working fluid is carbon dioxide. The use of the term carbon dioxide is not intended to be limited to carbon dioxide of any particular type, purity or grade of carbon dioxide although industrial grade carbon dioxide is the preferred working fluid. Carbon dioxide is a greenhouse friendly and neutral working fluid that offers benefits such as non-toxicity, non-flammability, easy availability, low price, and no need of recycling.

In the preferred embodiment, the working fluid is in a supercritical state over certain portions of the system (the "high pressure side"), and in a subcritical state at other portions of the system (the "low pressure side"). In other embodiments, the entire cycle may be operated such that the working fluid is in a supercritical or subcritical state during the entire execution of the cycle.

In various embodiments, the working fluid may a binary, ternary or other working fluid blend. The working fluid combination would be selected for the unique attributes possessed by the fluid combination within a heat recovery system as described herein. For example, one such fluid combination is comprised of a liquid absorbent and carbon dioxide enabling the combined fluid to be pumped in a liquid state to high pressure with less energy input than required to compress $CO_2$. In another embodiment, the working fluid may be a combination of carbon dioxide and one or more other miscible fluids. In other embodiments, the working fluid may be a combination of carbon dioxide and propane, or carbon dioxide and ammonia.

One of ordinary skill in the art would recognize that using the term "working fluid" is not intended to limit the state or phase of matter that the working fluid is in. In other words, the working fluid may be in a fluid phase, a gas phase, a supercritical phase, a subcritical state or any other phase or state at any one or more points within the cycle.

The inventive heat to electricity system may utilize other fluids in other parts of the system, such as water, thermal oils or suitable refrigerants; these other fluids may be used within heat exchangers and equipment external to the heat engine system 100 (such as at the cooler 12 and/or waste heat exchanger (WHX) 5 shown in FIG. 1) and within cooling or other cycles and subsystems that operate within the heat to electricity system (for example at the cooling loop of the radiator 4 provided at the alternator 2 of the thermal engine shown in FIG. 1).

As further described, in one representative embodiment, a 250 kW (net) or greater skid-based system, as illustrated conceptually in FIGS. 3A-3M, is provided for deployment at any source or site of waste or by-product heat. Nominal rated output (electrical or work) is not intended to be a limiting feature of the disclosure or related inventions.

The heat engine system 100 of the disclosure has three primary classes of equipment through which the working fluid may be circulated as the thermodynamic cycle is executed, (i) one or more heat exchangers (ii) one or more pumps and/or compressors and (iii) one or more expansion (work) devices (Such as a turbine, a ramjet, or a positive displacement expander (EXP) 3 such as a geroler or gerotor). Each of these pieces of equipment is operatively coupled in the cycle as shown on FIG. 1 through the use of suitable conduits, couplings and fittings, for example in a working fluid circuit, as further described.

The heat engine system 100 may also include a means for converting mechanical energy from the one or more expansion devices into electricity; such means may include but are not limited to a generator, alternator 2, or other device(s) and related power conditioning or conversion equipment or devices.

In one embodiment, certain components of the heat engine system 100 may share common elements such as in the case of a turboalternator (shown on FIG. 1) (where an expansion device shares a common shaft with an alternator 2) or in the case of a turbopump, where an expansion device shares a common shaft with a pump. Alternatively, the expansion device may be mechanically coupled to the electrical generating means (i) by magnetically coupling the turbine shaft to the rotor of the electrical generating means and/or (ii) by a gearbox operatively coupling the turbine shaft and the rotor of the electrical generating means.

The heat engine system 100 may also include other equipment and instruments such as sensors, valves (which may be on/off or variable), fittings, filters, motors, vents, pressure relief equipment, strainers, suitable conduit, and other equipment and sensors. The preferred heat engine system 100 includes the additional equipment shown on FIG. 1.

The preferred heat engine system 100 also includes a system for managing the amount of working fluid within the system such as the mass management system disclosed on FIG. 1, as further described.

The preferred heat engine system 100 also includes a control system and related equipment allowing for the automated and/or semi-automated operation of the engine, the remote control of the system and/or the monitoring of system performance.

The preferred heat engine system 100 also includes one or more cooling cycle systems to remove heat from and/or provide thermal management to one or more of the expansion device, the electrical producing means and/or the power electronics 1. In the preferred embodiment, there is provided a cooling cycle shown on FIG. 1 that removes heat from and provides thermal management to the mechanical coupling between the expander 3 and the alternator 2, the alternator 2, and the power electronics 1.

The system of the current invention is flexible and may utilize many different types of conventional heat exchangers. The preferred embodiment of the inventive heat engine system 100 utilizes one or more printed circuit heat exchangers (PCHE) or other construction of the heat exchanger, recuperator or cooler components, each of which may contain one or more cores where each core utilizes microchannel technology.

As used herein and known in the art, "microchannel technology" includes, but is not limited to, heat exchangers that contain one or more microchannels, mesochannels, and/or minichannels. As used herein the terms "microchannels," "mesochannels," and/or "minichannels" are utilized interchangeably. Additionally, the microchannels, mesochannels, and/or minichannels of the present invention are not limited to any one particular size, width and/or length. Any suitable size, width or length can be utilized depending upon a variety of factors. Furthermore, any orientation of the microchannels, mesochannels, and/or minichannels can be utilized in conjunction with the various embodiments of the present invention.

The expansion device (also referred to herein as an "expander") may be a valve or it may be a device capable of transforming high temperature and pressure fluid into mechanical energy. The expansion device may have an axial or radial construction; it may be single or multi-staged. Examples include a geroler, a gerotor, other types of positive displacement devices such as a pressure swing, a turbine, or any other device capable of transforming a pressure or pressure/enthalpy drop in a working fluid into mechanical energy.

In a preferred embodiment, the expander 3 is a turboalternator wherein the turbine is operatively coupled to the alternator 2 by either (i) sharing a single shaft (the "single design") or by operatively coupling the turbine shaft to the alternator 2 rotor (or other shaft) by using high powered magnets to cause two shafts to operate as a single shaft. In the preferred embodiment, the turbine is physically isolated from the alternator 2 in order to minimize windage losses within the alternator 2. Thus, in the preferred embodiment, while the turbine is operatively coupled to the alternator 2, the turbine and alternator 2 do not share a common housing (or casing). In the single shaft design, the turbine casing is sealed at the common shaft and thereby isolated from the alternator 2 through the use of suitable shaft seals. In the single shaft design, suitable shaft seals may be any of the following, labyrinth seal, a double seal, a dynamically pressure balanced seal (sometimes called a floating ring or fluid filled seal), a dry gas seal or any other sealing mechanism. In the magnetic coupling design, no shaft seals are required because it is possible to entirely encase the turbine within its housing thereby achieving the desired isolation from the alternator 2.

Among other differentiating attributes of the preferred turboalternator are its single axis design, its ability to deliver high isentropic efficiency (>70%), that it operates at high rotational speeds (>20K rpm), that its bearings are either not lubricated during operation or lubricated during operation only by the working fluid, and its capability of directly coupling a high speed turbine and alternator 2 for optimized system (turboalternator) efficiency. In the preferred embodiment, the turboalternator uses air-foil bearings; air foil bearings are selected as the preferred design due because they reduce or eliminate secondary systems and eliminate the requirement for lubrication (which is particularly important when working with the preferred working fluid, carbon dioxide). However, hydrostatic bearings, aerostatic hearings, magnetic bearings and other bearing types may be used.

The heat engine system 100 also provides for the delivery of a portion of the working fluid into the expander 3 chamber (or housing) for purposes of cooling one or more parts of the expander 3. In a preferred embodiment, due to the potential need for dynamic pressure balancing within the preferred heat engine's turboalternator, the selection of the site within the thermal engine from which to obtain this portion of the working fluid is critical because introduction of the portion of the working fluid into the turboalternator must not disturb the pressure balance (and thus stability) of the turboalternator during operation. This is achieved by matching the pressure of the working fluid delivered into the turboalternator for purposes of cooling with the pressure of the working fluid at the inlet of the turbine; in the preferred heat engine system 100, this portion of the working fluid is obtained after the working fluid passes a valve 25 and a filter F4. The working fluid is then conditioned to be at the desired temperature and pressure prior to being introduced into the turboalternator housing. This portion of the working fluid exits the turboalternator at the turboalternator outlet. A variety of turboalternator designs are capable of working within the inventive system and to achieve different performance characteristics.

The device for increasing the pressure of the working fluid from point A-B on FIG. 2 may be a compressor, pump, a ramjet type device or other equipment capable of increasing the pressure of the selected working fluid. In a preferred embodiment, the device is a pump 9, as depicted in FIG. 1. The pump 9 may be a positive displacement pump, a centrifugal pump, or any other type or construction of a pump.

The pump 9 may be coupled to a VFD (variable frequency drive) 11 to control speed which in turn can be used to control the mass flow rate of the working fluid in the system, and as a consequence of this control the high side system pressure. The VFD 11 may be in communication with a control system, as further described.

In another embodiment of the inventive thermal engine, the pump 9 may be constructed such that there is a common shaft (not shown) connecting it with an expansion device enabling the pump to be driven by the mechanical energy generated by expansion of the working fluid (e.g., a turbopump). A turbopump may be employed in place of or to supplement the pump of the preferred embodiment. As noted in the section above detailing the turboalternator, the "common shaft" may be achieved by using a magnetic coupling between the expansion device's shaft and the pump shaft. In one embodiment of the heat engine system 100 with a turbopump, there is provided a secondary expander that is coupled to the pump by a common shaft. The secondary expander is located within a stream of fluid which runs parallel to the stream to the primary system expander 3 and there are two valves on either side of the secondary expander to regulate flow to the secondary expander. It should be noted that there need not be a second expander in order to form a turbopump. The common shaft of the turbopump may be shared with the common shaft of the primary system expander 3 and/or, in a preferred embodiment, the common shaft of the turboalternator. Similarly, if the system uses a secondary expander to share a common shaft with the turbopump, the secondary expander need not be located as described above.

The electrical producing means of one embodiment of the thermal engine is a high speed alternator 2 that is operatively coupled to the turbine to form a turboalternator (as described above). The electrical producing means may alternatively be any known means of converting mechanical energy into electricity including a generator or alternator 2. It may be operatively coupled to the primary system expander 3 by a gear box, by sharing a common shaft, or by any other mechanical connection.

The electrical producing means is operatively connected to power electronics 1 equipment set. In the preferred embodiment, the electrical output of the alternator 2 is mated with a high efficiency power electronics 1 equipment set that has equipment to provide active load adjustment capability (0-100%). In the preferred embodiment, the power electronics 1 system has equipment to provide the capability to convert high frequency, high voltage power to grid-tie quality power at appropriate conditions with low total harmonic distortion (THD), SAG support, current and voltage following, VAR compensation, for providing torque to start the turboaltemator, and dynamic braking capability for versatile and safe control of the turboalternator in the event of load loss; it has also capability of synchronizing and exporting power to the grid for a wide voltage and speed range of the alternator 2. In the preferred embodiment, the pump 9 inlet pressure has a direct influence on the overall system efficiency and the amount of power that can be generated. Because of the thermo-physical properties of the preferred working fluid, carbon dioxide, as the pump 9 inlet temperature rises and falls the system must control the inlet pressure over wide ranges of inlet pressure and temperature (for example, from −4° F. to 104° F.; and 479 psia to 1334 psia). In addition, if the inlet pressure is not carefully controlled, pump 9 cavitation is possible.

A mass management system is provided to control the inlet pressure at the pump 9 by adding and removing mass from the system, and this in turn makes the system more efficient. In the preferred embodiment, the mass management system operates with the system semi-passively. The system uses sensors to monitor pressures and temperatures within the high pressure side (from pump 9 outlet to expander 3 inlet) and low pressure side (from expander 3 outlet to pump 9 inlet) of the system. The mass management system may also include valves, tank heaters or other equipment to facilitate the movement of the working fluid into and out of the system and a mass control tank 7 for storage of working fluid.

As shown on FIG. 1, in the case of the preferred embodiment, the mass management system includes the equipment operatively connected by the bolded lines or conduits of the diagram and at (and including) equipment at the termination points of the mass control system (e.g., 14, 15, 16, 17, 18, 21, 22, and 23). The preferred mass management system removes higher pressure, denser working fluid (relative to the pressure, temperature, and density on the low pressure side of the system) from the thermodynamic cycle being executed by the thermal engine via the valve 16. The mass management system dispenses working fluid into the main heat engine system 100 via valves 14 and 15. By controlling the operation of the valves 14, 15 and 16, the mass management system adds or removes mass from the system without a pump, reducing system cost, complexity, and maintenance.

In the preferred embodiment of the system, the mass control tank 7 is filled with working fluid. It is in fluid communication with valves 14 and 16 such that opening either or both valves 14,16 will deliver working fluid to the top of the mass control tank 7. The mass control tank 7 is in fluid communication with valve 15 such that opening valve 15 will remove working fluid from the bottom of the mass control tank 7. The working fluid contained within the mass control tank 7 will stratify with the higher density working fluid at the bottom of the tank and the lower density working fluid at the top of the tank. The working fluid may be in liquid phase, vapor phase, or both; if the working fluid is in both vapor phase and liquid phase, there will be a phase boundary separating one phase of working fluid from the other with the denser working fluid at the bottom of the mass control tank 7. In this way, the valve 15 will also deliver to the system the densest working fluid within the mass control tank 7.

In the case of the preferred embodiment, this equipment set is combined with a set of sensors within the main heat engine system 100 and a control system as described within.

In the case of the preferred embodiment, this mass management system also includes equipment used in a variety of operating conditions such as start-up, charging, shut-down and venting the heat engine system 100 as shown on FIG. 1.

Exemplary operation of the preferred embodiment of the mass management system follows. When the working fluid in the mass control tank 7 is at vapor pressure for a given ambient temperature, and the low side pressure in the system is above the vapor pressure, the pressure in the mass control tank 7 must be increased, to allow for the addition of mass into the system. This can be controlled by opening the valve 14 and thereby allowing higher pressure, higher temperature, lower density supercritical working fluid to flow into the mass control tank 7. Valve 15 is opened to allow higher density liquid working fluid at the bottom of the mass control tank 7 to flow into the system and increase pump 9 suction pressure.

The working fluid may be in liquid phase, vapor phase, or both. If the working fluid is in both vapor phase and liquid phase, there will be a phase boundary in the mass control tank 7. In general, the mass control tank 7 will contain either a mixture of liquid and vapor phase working fluid, or a mass of supercritical fluid. In the former case, there will be a phase boundary. In the latter case, there will not be a phase boundary (because one does not exist for supercritical fluids). The fluid will still tend to stratify however, and the valve 15 can be opened to allow higher density liquid working fluid at the bottom of the mass control tank 7 to flow into the system and increase pump suction pressure. Working fluid mass may be added to or removed from the working fluid circuit via the mass control tank 7.

The mass management system of the disclosure may be coupled to a control system such that the control of the various valves and other equipment is automated or semi-automated and reacts to system performance data obtained via sensors located throughout the system, and to ambient and environmental conditions.

Other configurations for controlling pressure and/or temperature (or both) in the mass control tank 7 in order to move mass in and out of the system (e.g., the working fluid circuit), include the use of a heater and/or a coil within the vessel/tank or any other means to add or remove heat from the fluid/vapor within the mass control tank 7. Alternatively, mechanical means, such as providing pump may be used to get working fluid from the mass control tank 7 into the system.

One method of controlling the pressure of the working fluid in the low side of the working fluid circuit is by control of the temperature of the working fluid vessel or mass control tank 7. A basic requirement is to maintain the pump 9 inlet pressure above the boiling pressure at the pump 9 inlet. This is accomplished by maintaining the temperature of the mass control tank 7 at a higher level than the pump 9 inlet temperature. Exemplary methods of temperature control of the mass control tank 7 are: direct electric heat; a heat exchanger coil with the pump 9 discharge fluid (which is at a higher temperature than at the pump 9 inlet), or a heat exchanger coil with spent cooling water from the cooler/condenser (also at a temperature higher than at the pump 9 inlet).

As shown in FIGS. 3A-3M, with continuing reference to FIG. 1, the waste heat recovery system of the disclosure may be constructed in one form with the primary components described and some or all of which may be arranged on a single skid or platform or in a containment or protective enclosure, collectively referred to herein as a "skid" or "support structure". FIGS. 3A-3M illustrate a representative embodiment of the inventive heat engine system 100 with exemplary dimensions, port locations, and access panels. Some of the advantages of the skid type packaging of the inventive heat engine system 100 include general portability and installation access at waste heat sources, protection of components by the external housing, access for repair and maintenance, and ease of connection to the inventive heat engine system 100 energy output, to a grid, or to any other sink or consumer of energy produced by the inventive heat engine system 100. As shown in FIGS. 3A-3M, the heat engine system 100 is constructed upon a frame having the representative and exemplary dimensions, and within a housing on the frame. Access and connection points are provided external to the housing as indicated, in order to facilitate installation, operation and maintenance.

Figure 3A:
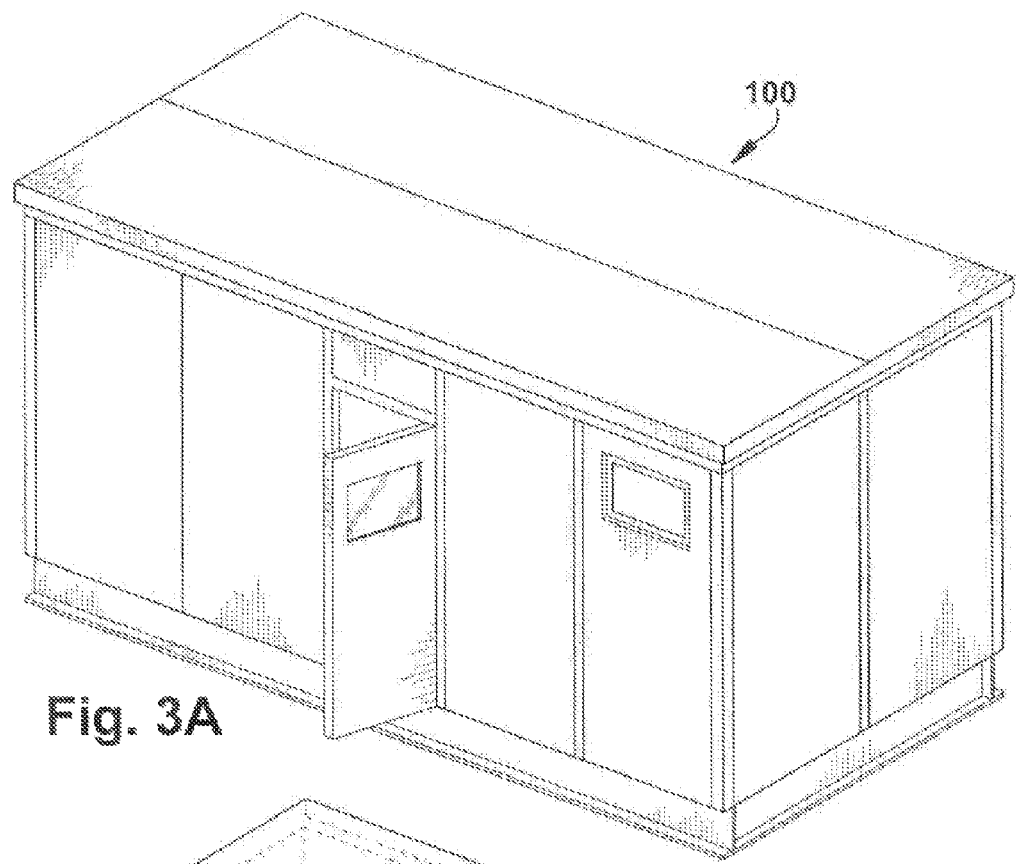
Figure 3B:
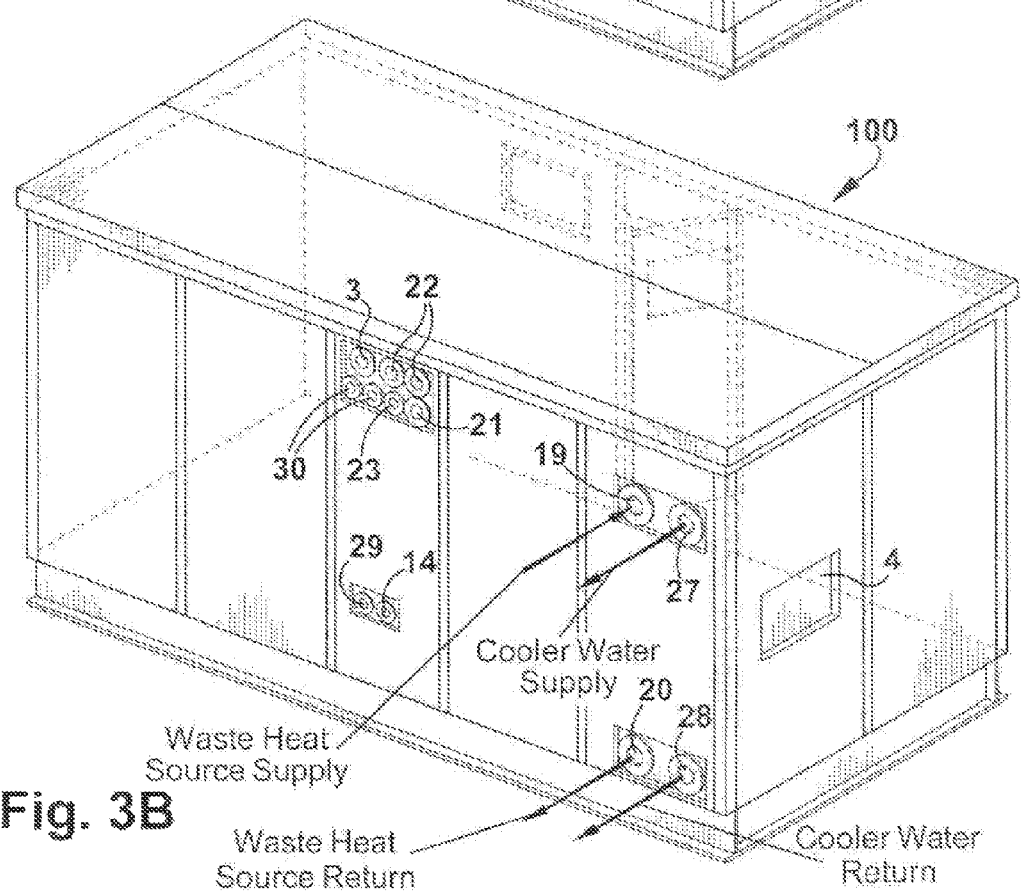
Figure 3C:
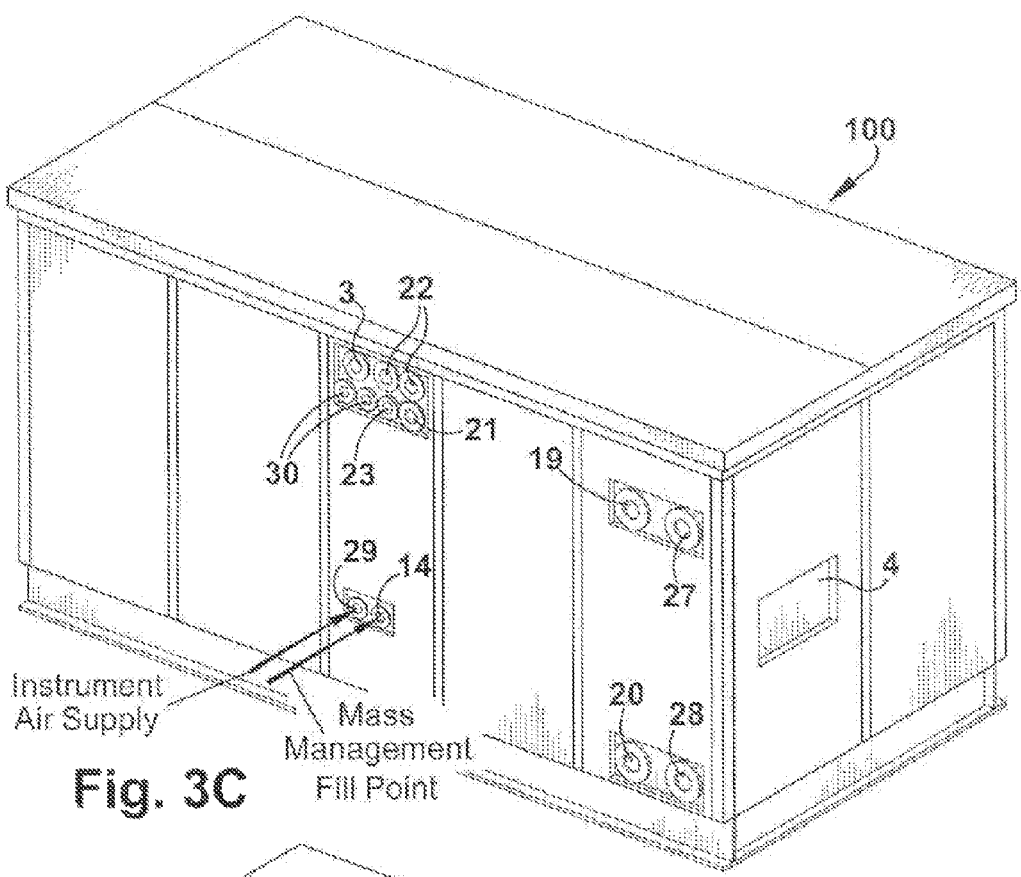
Figure 3D:
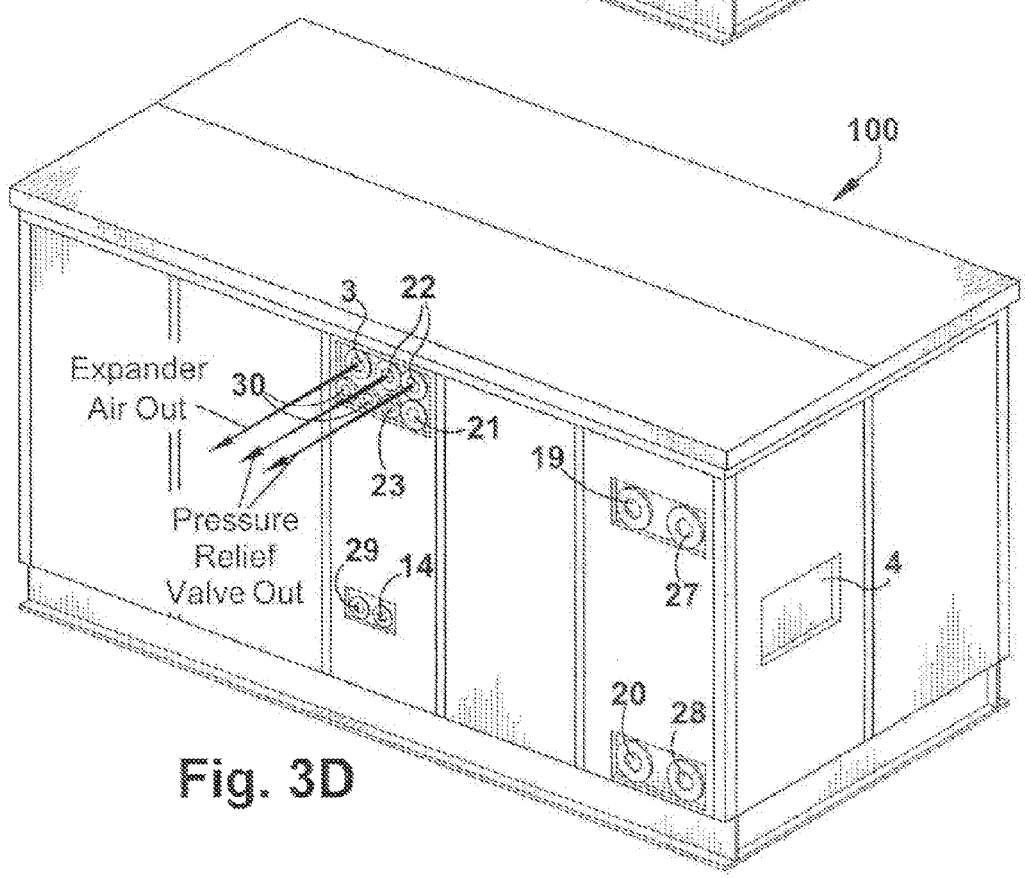
Figure 3E:
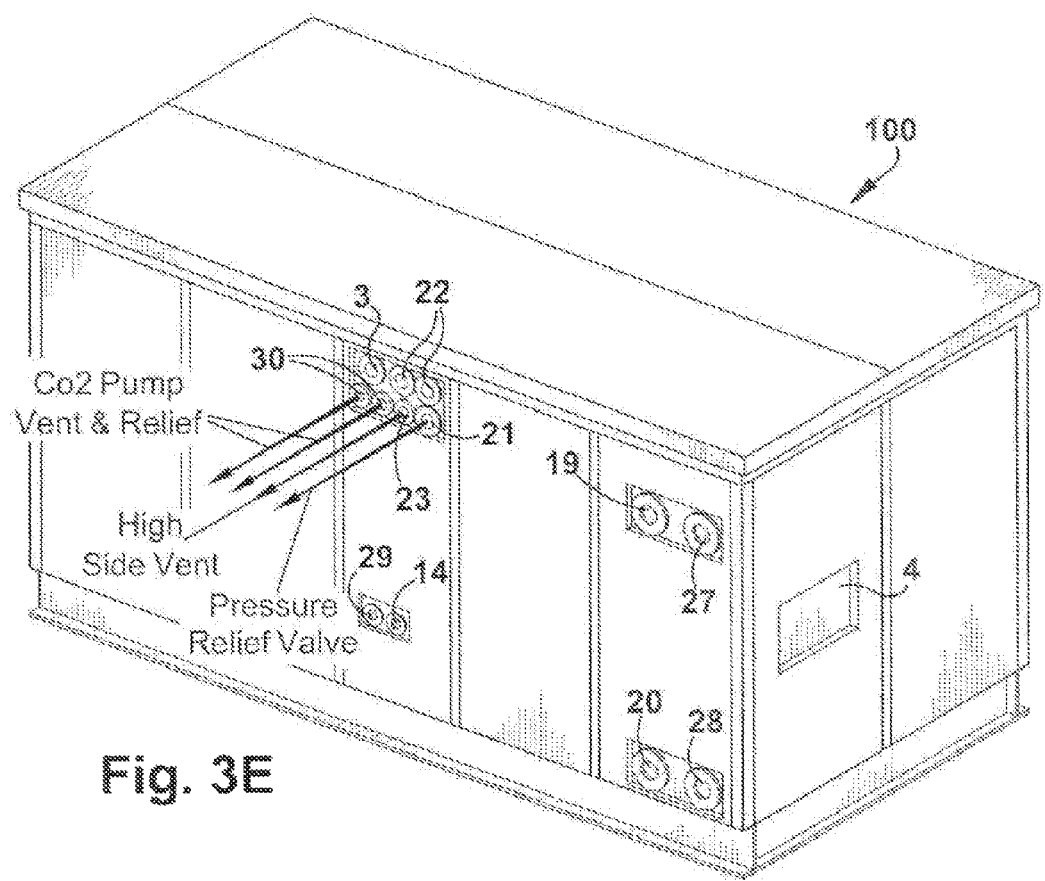
Figure 3F:
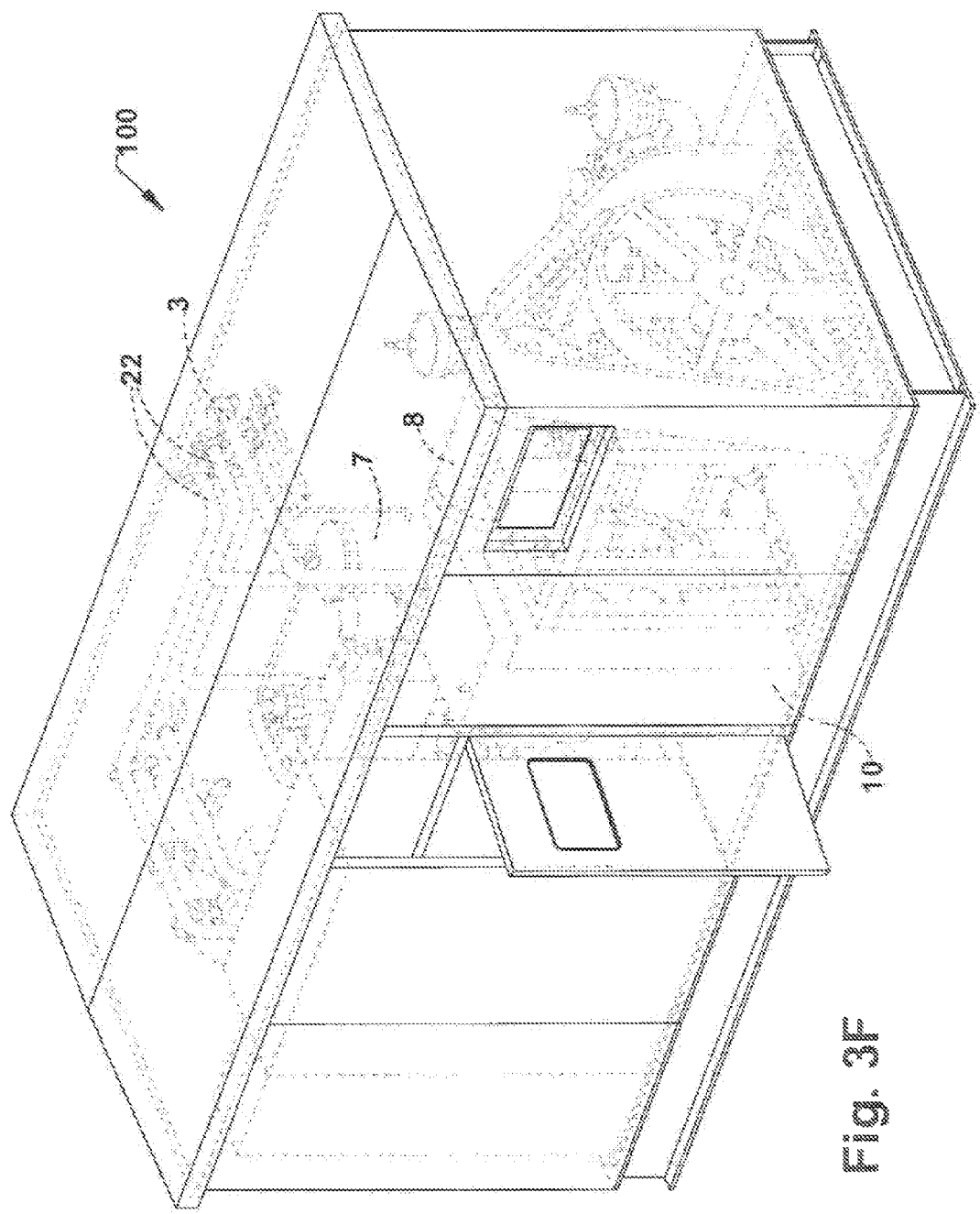
Figure 3G:
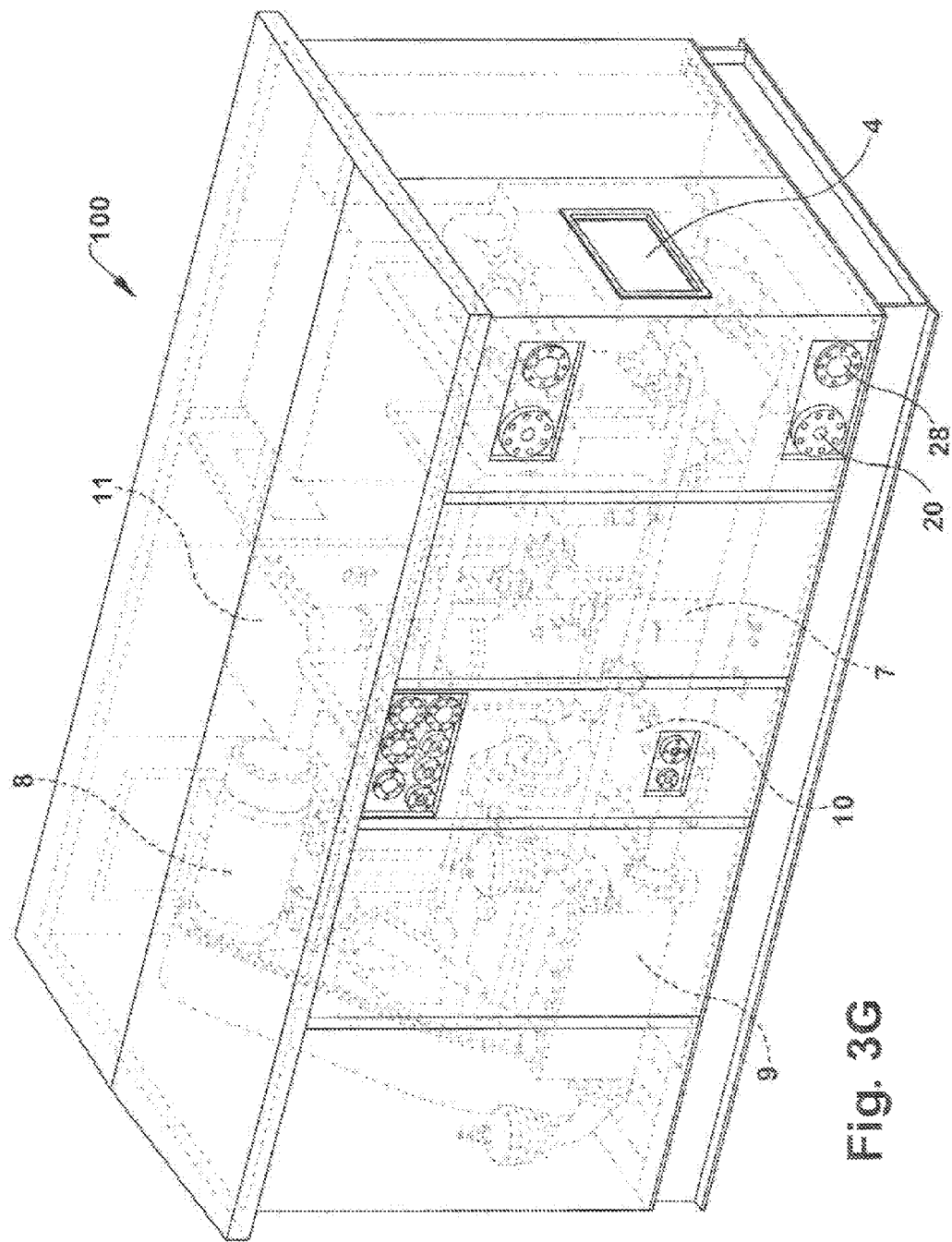
Figure 31:
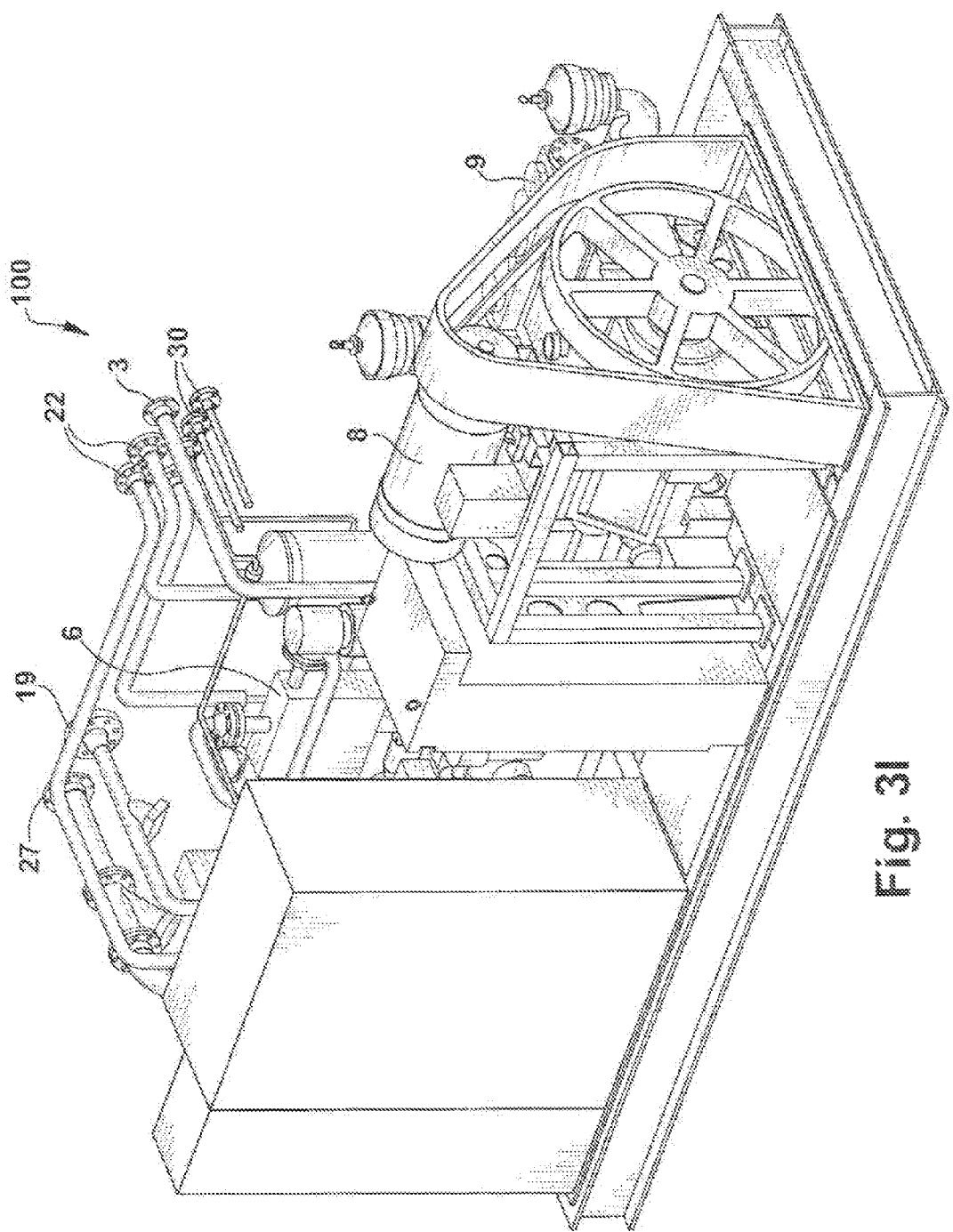
Figure 3J:
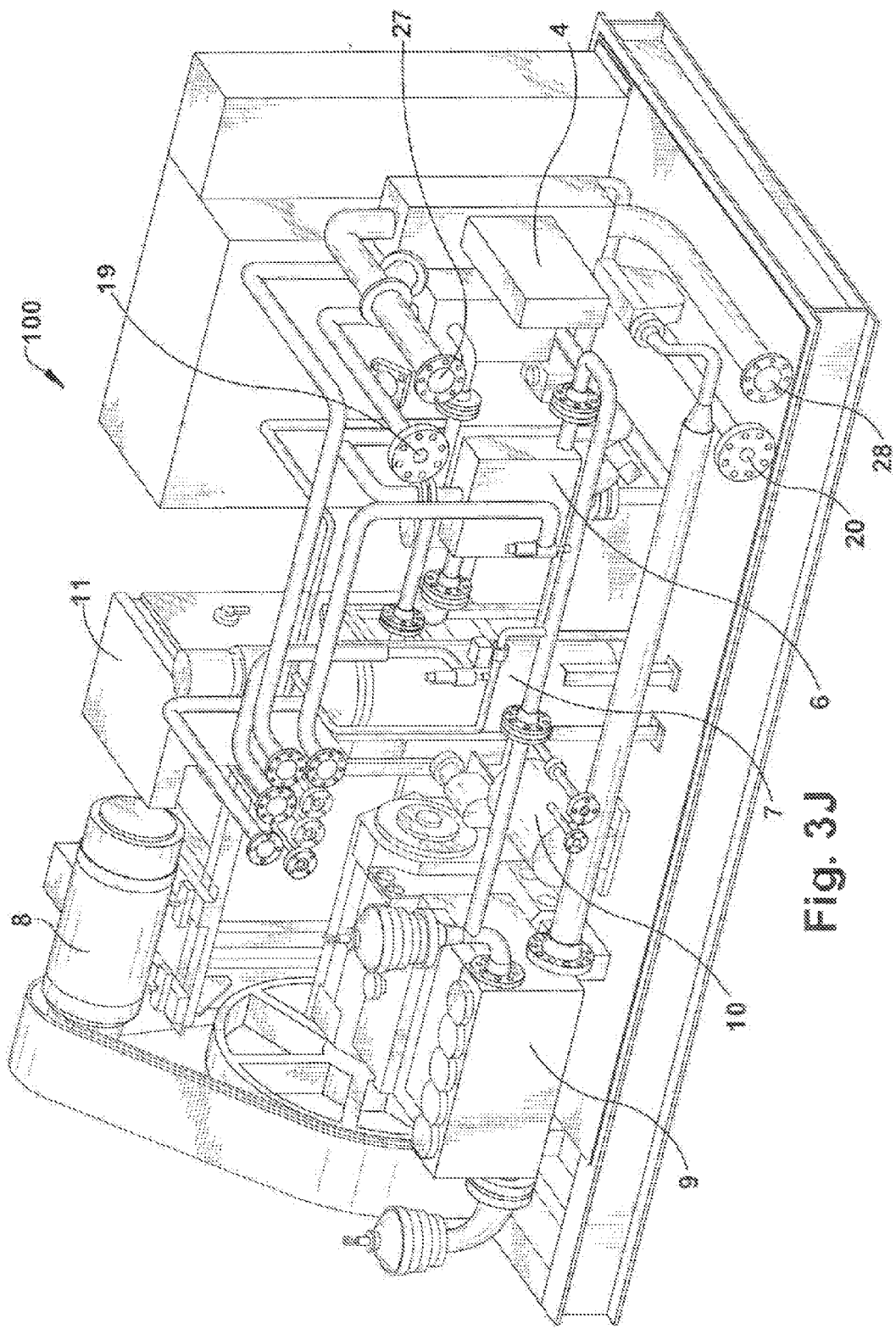

FIGS. 3B-3E indicate the various operative connections to the inventive heat engine system 100 including the waste heat source supply 19, cooling water supply, and water heat source and cooling water return lines (FIG. 3B); instrument aft supply 29 and a mass management (working fluid) fill point 21 (FIG. 3C); expander 3 air outlet and pressure relief valves exhaust 22 (FIG. 3D); and $CO_2$ pump vent 30, high pressure side vent 23, and additional pressure relief valve exhaust (FIG. 3E). Adequate ventilation, cooling via radiators 4 as required and sound-proofing is also accommodated by the housing design. The principle components of the system are indicated on FIG. 3M and illustrated pipe connections. The VFD 11, programmable logic controller (PLC) and electrical power panel (power out) are schematically illustrated as installed within the housing.

Also included on or off the skid, or otherwise in fluid or thermal communication with the working fluid circuit of the system, is at least one waste heat exchanger 5 (also shown in FIG. 1). The waste heat exchanger 5 uses a heat transfer fluid (such as may be provided by any suitable working fluid or gas, such as for example, Therminol® XP), which is ported to the waste heat exchanger 5 from an off-skid thermal source, through the exterior of the skid enclosure through a waste heat source supply port 19 through the waste heat exchanger 5 circuit to a waste heat source return 20 exiting the housing (FIGS. 3A-3E). In the preferred embodiment, heat is transferred to the system working fluid in the waste heat exchanger 5. The working fluid flow and pressure entering the expander 3 may be controlled by the start, shutoff and bypass valves and by the control system provided herein. Also provided is a cooler 12, where additional residual heat within the working fluid is extracted from the system, increasing the density of the working fluid, and exits the cooler 12 and into the system pump 9. The cooler 12 may be located on or off the skid.

Supercritical working fluid exits the pump 9 and flows to the recuperator (REC) 6, where it is preheated by residual heat from the low pressure working fluid. The working fluid then travels to the waste heat exchanger 5. From the waste heat exchanger 5, the working fluid travels to the expander 3. On the downstream side of the expander 3, the working fluid is contained in a low pressure side of the cycle. From the expander 3 the working fluid travels through the recuperator 6, then to the cooler 12 and then back to the pump 9.

Suitable pressure and temperature monitoring at points along the lines and at the components is provided and may be integrated with an automated control system.

A control system can be provided in operative connection with the inventive heat engine system 100 to monitor and control the described operating parameters, including but not limited to: temperatures, pressures (including port, line and device internal pressures), flow metering and rates, port control, pump operation via the VFD, fluid levels, fluid density leak detection, valve status, filter status, vent status, energy conversion efficiency, energy output, instrumentation, monitoring and adjustment of operating parameters, alarms and shut-offs.

As further described, a representative control system may include a suitably configured programmable logic controller (PLC) with inputs from the described devices, components and sensors and output for control of the operating parameters. The control system may be integral with and mounted directly to the inventive heat engine system 100 or remote, or as part of distributed control system and integrated with other control systems such as for an electrical supply grid. The control system is programmable to set, control or change any of the various operating parameters depending upon the desired performance of the system. Operating instrumentation display may be provided as a composite dashboard screen display of the control system, presenting textual and graphic data, and a virtual display of the inventive heat engine system 100 and overall and specific status. The control system may further include capture and storage of heat engine system 100 operational history and ranges of all parameters, with query function and report generation.

A control system and control logic for a 250 kW nominally net power rated thermafficient heat engine system 100 of the disclosure may include the following features, functions and operation: automated unmanned operation under a dedicated control system; local and remote human machine interface capability for data access, data acquisition, unit health monitoring and operation; controlled start-up, operation and shut down in the case of a loss of electrical incoming supply power or power export connection; fully automated start/stop, alarm, shut down, process adjustment, ambient temperature adjustment, data acquisition and synchronization; a controls/power management system designed for interfacing with an external distributed plant control system.

Figure 4A:
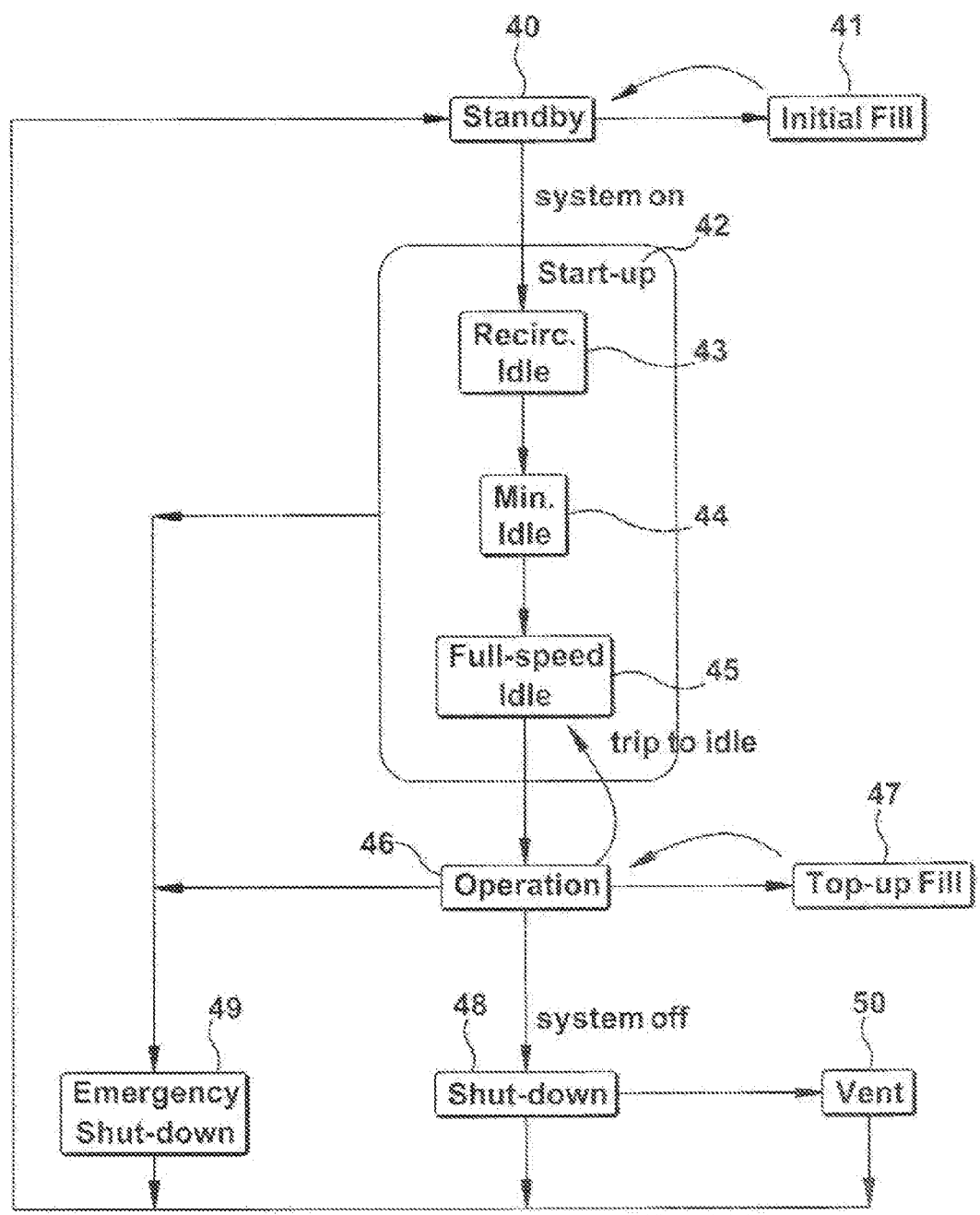
FIG. 4A is a flow chart of operational states of a heat engine of the disclosure.
Figure 4B:
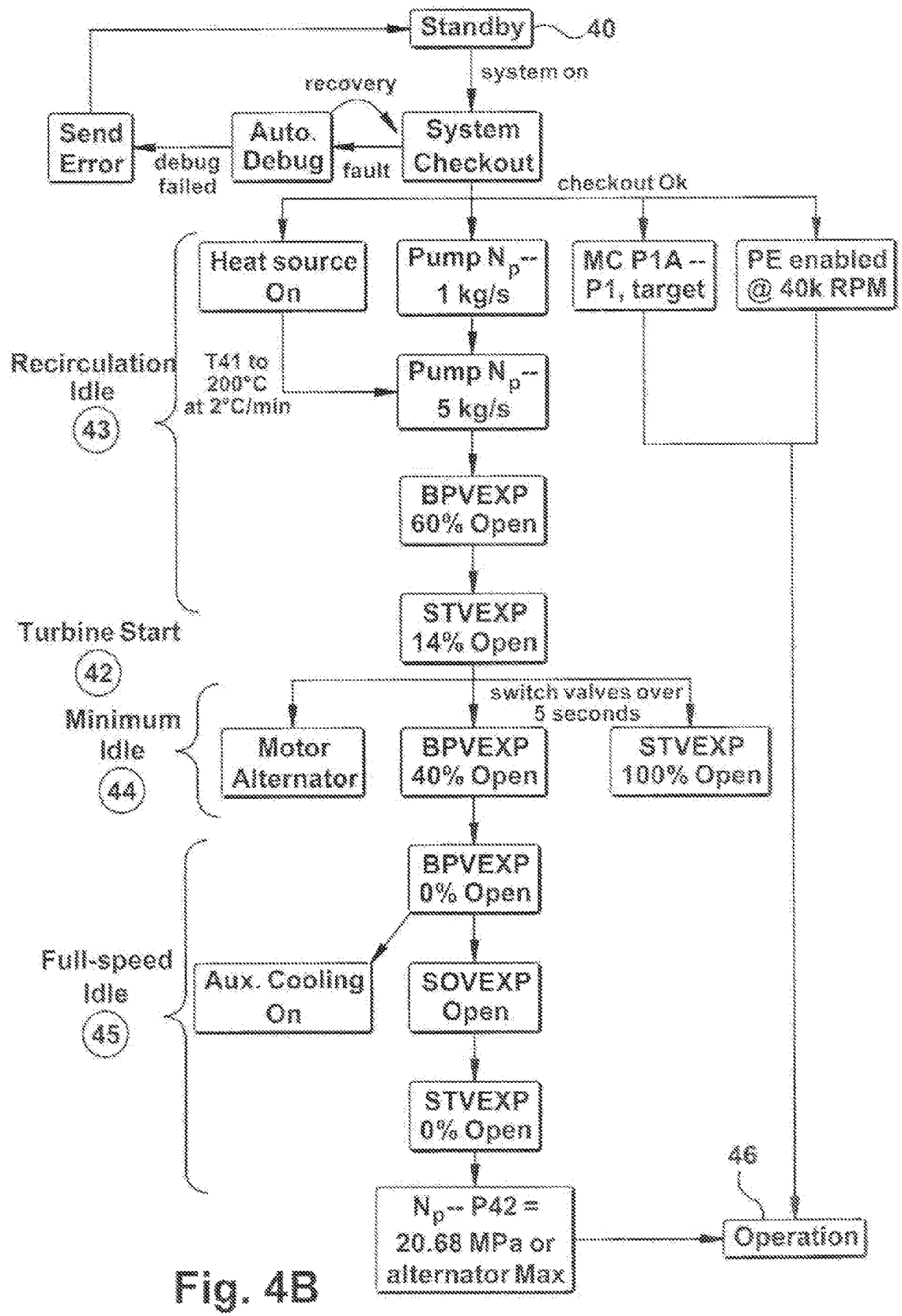
FIG. 4B is a flow chart representing a representative start-up and operation sequence for a heat engine of the disclosure.
Figure 4C:
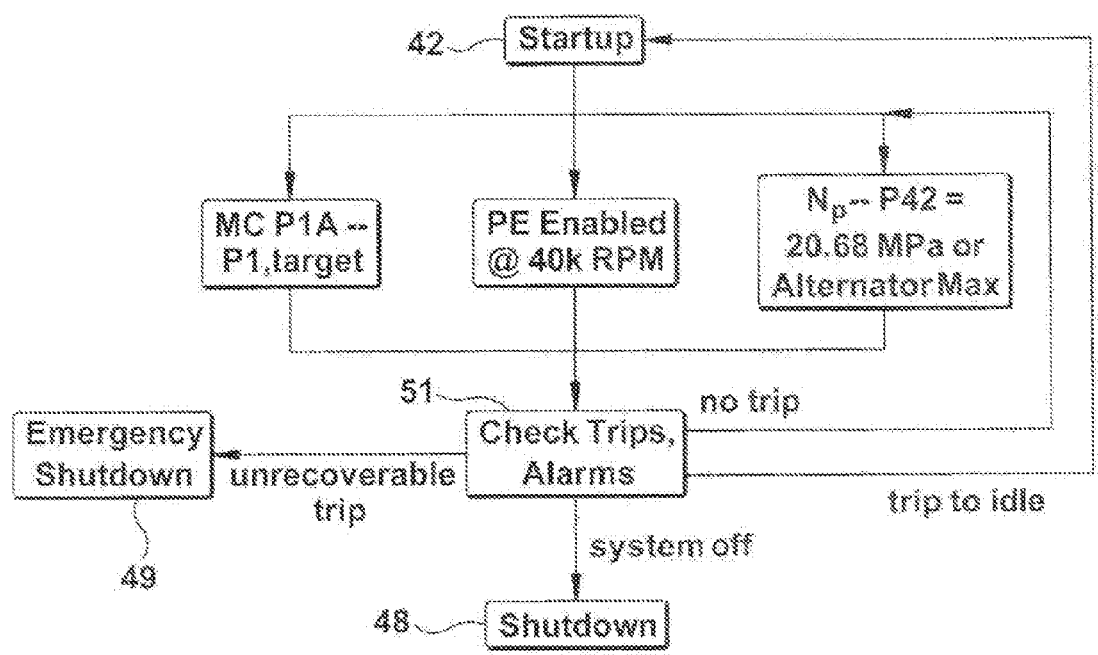
FIG. 4C is a flow chart representing a shut-down sequence for a heat engine of the disclosure.

An exemplary control system for the thermafficient heat engine system 100 may have multiple control states as depicted in FIG. 4A, including the following steps and functions. Initial fill of a working fluid at 41 may be used to purge and fill an empty system and allowing the system to warm for startup. Top-up fill at 47 may be used to add mass to the mass management tank(s) while the system is in operation. Standby at 40 may be used to power up of sensors and the controller, to provide no fluid circulation, and to warm-up systems active if necessary. Startup is at 42. Recirculation idle at 43 may be used for fluid circulation with turbine in bypass mode, gradually warming up recuperator, cooling down the waste heat exchanger, and BPVWHX (bypass valve for the waste heat exchanger) initially open, but closes as hot slug is expelled from the waste heat exchanger. Minimum idle at 44 may be used with turbine at minimum speed (about 20 k RPM) to achieve bearing lift-off and turbine speed may be maintained (closed-loop) through a combination of pump speed and valve 24 position. Full speed idle at 45 may be used with turbine at design speed (40 k RPM) with no load and pump speed sets turbine speed (closed-loop). Operation at 46 may be used with turbine operating at design speed and produced nominal design power and may switch to load control from pump speed control by ramping up pump speed while using power electronics 1 load to maintain turbine speed at 40 k RPM. Shutdown at 48 may be used with controlled stop of the expander 3 (e.g., turboexpander) and gradual cooling of the system. An emergency shutdown at 49, for unexpected system shutdown, the pump 9 and the expander 3 is brought down quickly and heat exchangers allowed to cool passively, and venting at 50 may be used to drain the system and remove pressure for maintenance activities.

Figure 5A:
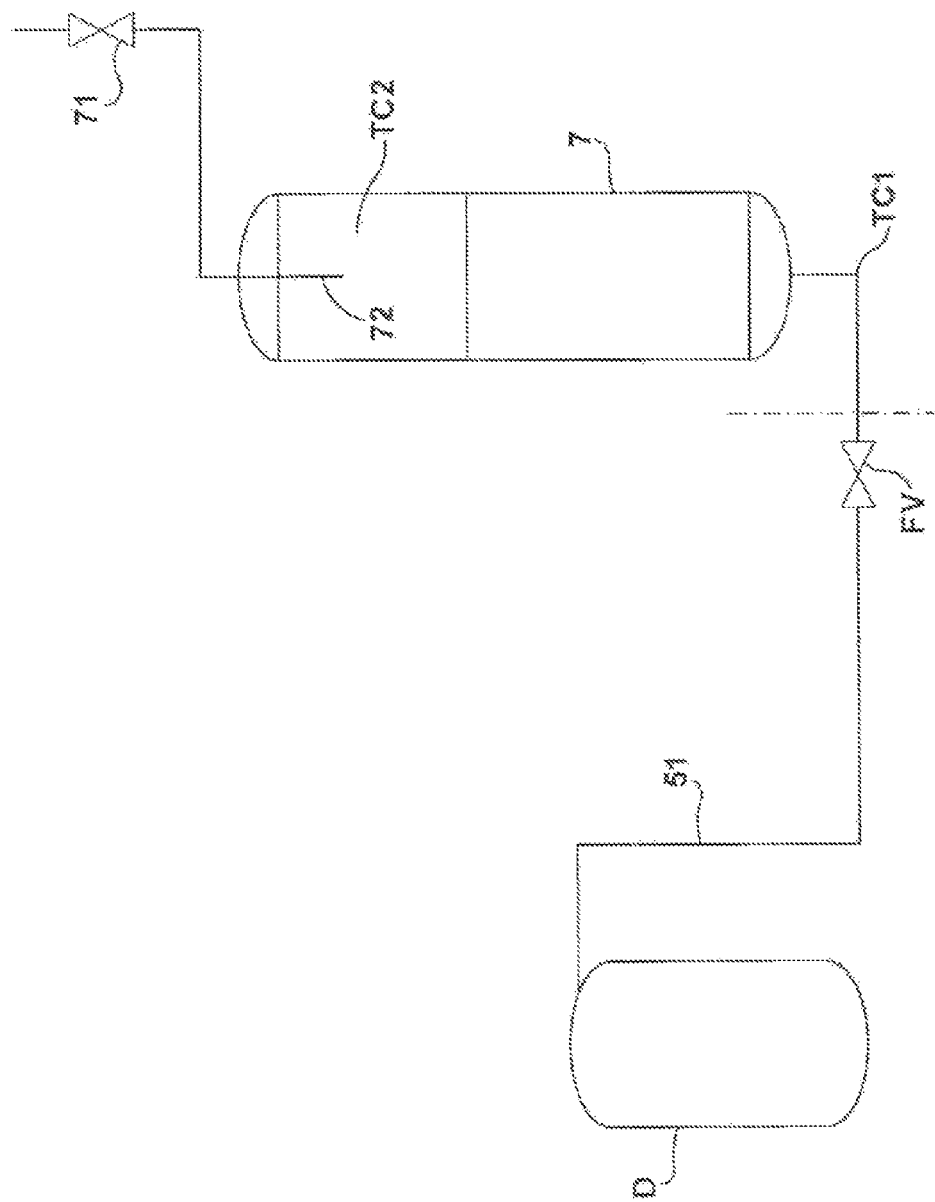
FIG. 5A is a schematic of a working fluid fill system of the present disclosure.

As schematically illustrated in FIG. 5A, to fill working fluid into the working fluid circuit of a waste heat recovery or heat engine system as described with a working fluid such as $CO_2$, the disclosure further includes a working fluid supply which is connected in various ways to the waste heat recovery/heat engine as described. In one form, a working fluid supply is contained in a working fluid supply tank, also referred to herein as a "fill storage tank" or "fluid supply tank", which in one embodiment may be in the form of a Dewar D, as may be commercially provided by a gas or chemical supplier. A pressure differential between a Dewar D (e.g., a liquid $CO_2$ holding container) and the working fluid vessel, e.g., mass control tank 7, of the mass management system is utilized. This pressure differential drives the fluid from the Dewar D via line 51 (referred to herein as the "working fluid supply line") into a working fluid vessel such as the mass control tank 7 or "mass management vessel". In a preferred embodiment the working fluid is $CO_2$ and as a result, during operation at certain pressures and temperatures, as the working fluid is going to the mass control tank 7 it may evaporate as it comes in contact with the relatively warmer tank 7; this condition continues until the surface of the mass control tank 7 cools to the saturation temperature for the given tank pressure. The inventive fill system may further provide a means for controlling the temperature and/or pressure of the working fluid within the mass control tank 7, such as via a control valve or vent valve 71 located on the vent line of the tank. The Dewar D is connected or connectable to the working fluid circuit via one or more fluid lines, as further described. The Dewar D may be externally connected to the working fluid circuit of the heat engine, as indicated on FIGS. 5A-5D, or incorporated therein, or enclosed within the skid enclosure. Also, external fittings can be provided for connection of the Dewar to the working fluid circuit of the skid.

A first thermocouple TC1 may be placed at the inlet of the mass storage tank 7, e.g., near the bottom of the tank, and a second thermocouple TC2 placed at the top of the mass control tank 7 to indicate when the mass control tank 7 is full. As the mass control tank 7 fills the temperature of the tank drops, when the temperature at the top of the tank is equal to the temperature at the bottom of the tank, the mass control tank 7 is indicated as full. A liquid eductor tube or "dip tube" 72 is provided to prevent overfilling of the tank. The dip tube 72 comes in from the top of the tank and extends downward to a fill height of the mass control tank 7. This guarantees that a fluid line in the mass control tank 7 will never go above the lowest or distal end of the dip tube 72 within the mass control tank 7. Once the mass control tank 7 is filled, heaters may be used to bring the liquid $CO_2$ in the mass control tank 7 up to system pressure.

The working fluid contained within the circulation loop of the heat engine system, that contained in the mass control tank 7, and that contained in the storage vessel of the inventive working fluid fill system may have different temperatures and pressures. Thus, there is a need to manage this pressure and temperature differential in order to permit the pressure differential to operate to drive working fluid from the fill system to the mass management system of the heat engine. Working fluid which is stored in the fill storage tank may evaporate when it comes in contact with the warm metal of the mass management storage tank and/or the conduit between the fill storage tank and the mass management storage tank. The fluid continues to evaporate until the metal cools to the saturation temperature for the given tank pressure. In a preferred mode of operation the working fluid will be at or above approximately $-20°$ F. This corresponds to a pressure of 214.91 psia, which is controlled with a control valve on the vent line of the tank. Once the metal cools the tank then begins to fill with working fluid. Vacuum jacketed pipe may be used to minimize the amount of evaporated fluid.

Figure 5B:
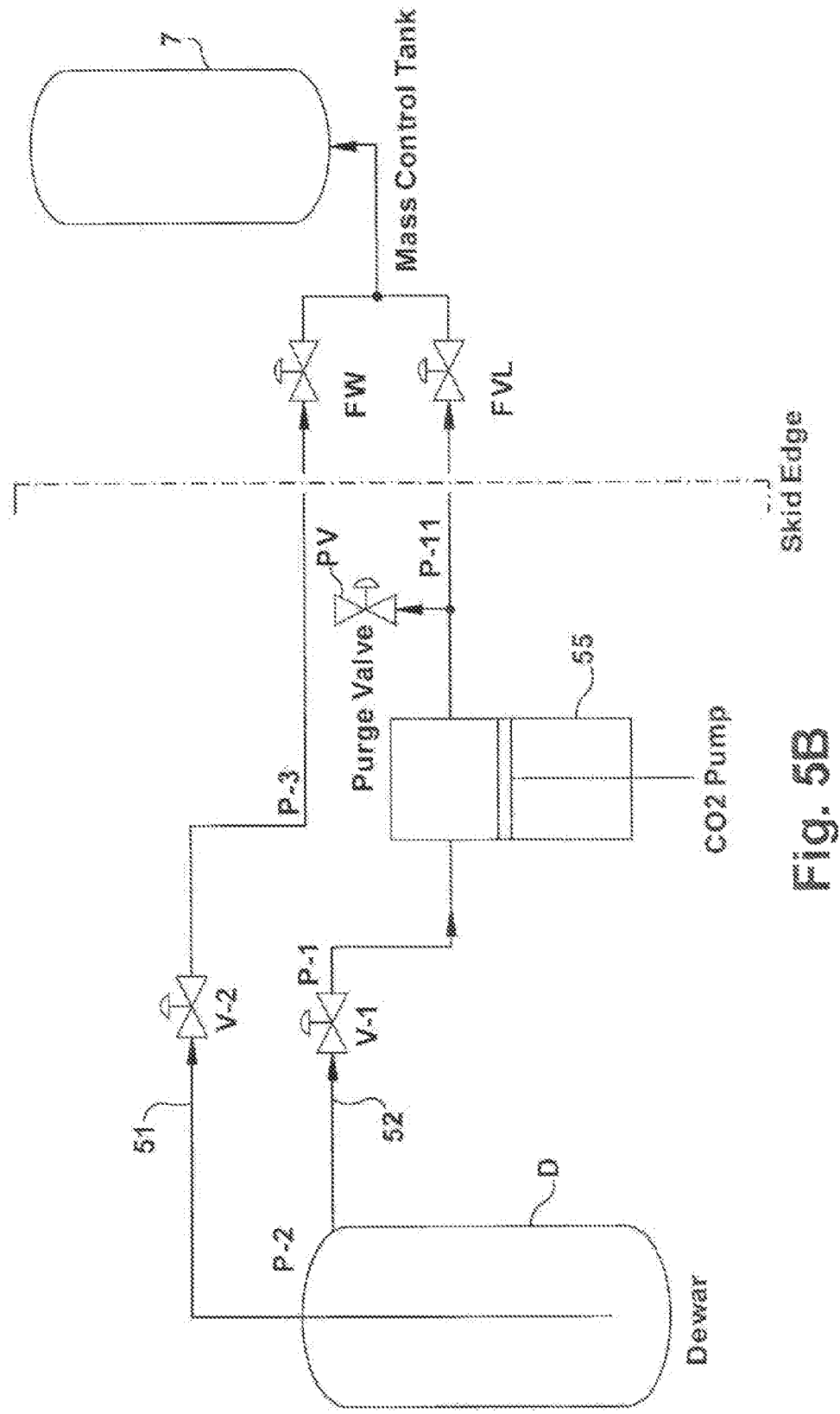
FIG. 5B is a schematic of a heat engine system having a working fluid circuit with a working fluid fill system of the present disclosure.

FIG. 5B discloses another embodiment of the present invention. In this embodiment of top feed storage the working fluid liquid is drawn from the top of the working fluid (e.g., $CO_2$) storage vessel (Dewar D) via the working fluid supply line 52 to the mass control tank 7. A working fluid pump 55 is placed in the working fluid supply line 52 from the Dewar D, operative to pump working fluid to the mass control or low pressure side in the working fluid circuit. Valve V1 is opened and liquid $CO_2$ flows through the pump 55 and through a purge valve PV. When liquid is sensed at the purge valve PV, the purge valve PV is closed and the fill valve FVL leading to the mass control tank 7 is opened. The sensing can be done using a thermocouple or other means or devices. Working fluid is then pumped to the mass control tank 7 and allowed to continue until a condition is met. This can be but is not limited to, a system pressure, a totalized amount from a flow meter, or a mass reading on the scale. Once the condition is met, the pump 55 is turned off, and all valves are returned to their home positions. This embodiment further includes a working fluid vapor line 51 which runs from the Dewar D to the mass control tank 7 and connected to the working fluid supply line 52.

Figure 5C:
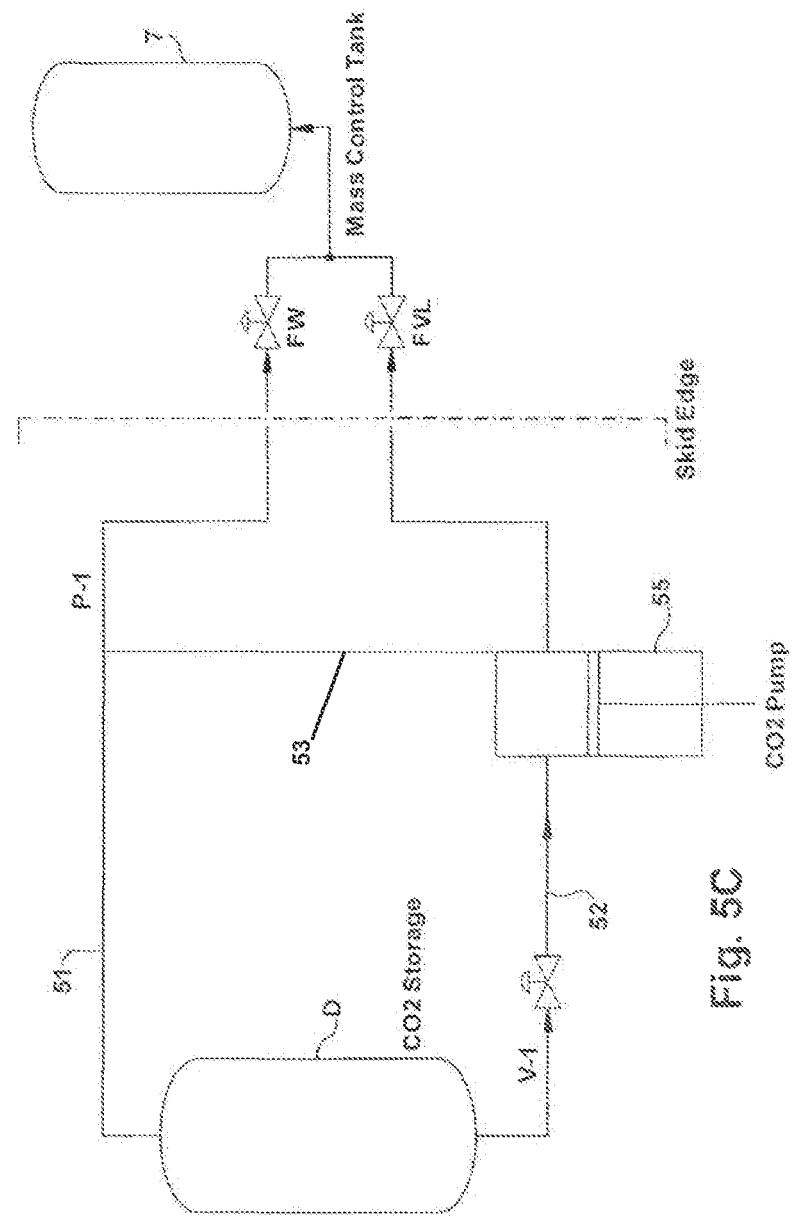
FIG. 5C is a schematic of a heat engine system having a working fluid circuit showing an embodiment of the working fluid fill system of the present disclosure.

FIG. 5C discloses another embodiment of the present invention. In this embodiment, bottom feed storage indicates the liquid draw is coming from the bottom of the $CO_2$ storage vessel via line 52, and pumped by pump 55 to the mass control tank 7 for mass control or in other words to the low side pressure of the system. A suction return line 53 runs from a suction cavity of the pump to the vapor return of the $CO_2$ storage vessel. This line keeps the pump suction chamber flooded with liquid $CO_2$ allowing for faster startups, and a less complicated control scheme to operate. When the auto-fill sequence is initiated, valve V1 is opened and the pump 55 is turned on. Liquid $CO_2$ is then pumped to the mass control tank 7 or skid, and allowed to continue until a condition is met. This can be but is not limited to, a system pressure, a totalized amount from a flow meter, or a mass reading on the scale. Once the condition is met, the pump 55 is turned off, and all valves go back to their home positions.

Figure 5D:
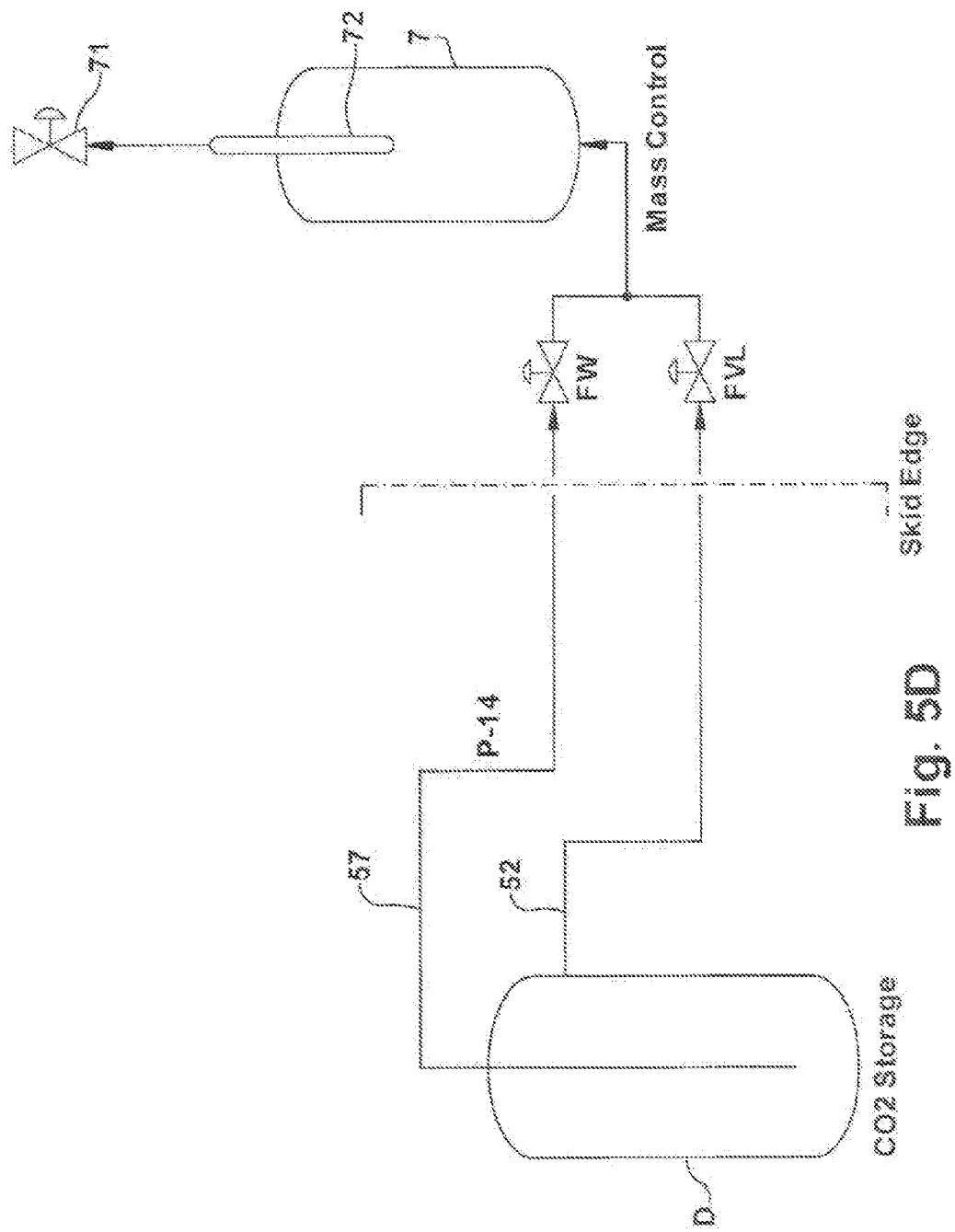
FIG. 5D is a schematic of a heat engine system having a working fluid circuit showing an embodiment of the working fluid fill system of the present disclosure.

FIG. 5D discloses another embodiment of the disclosure in which the following sequence works with both top feed and bottom feed $CO_2$ storage vessels. Valve 71 is opened, when the pressure in the mass control tank 7 (PMC) is below the $CO_2$ storage vessel (Dewar) pressure, and fill valve FVL is opened. Liquid CO$_2$ is then allowed to flow from the storage vessel to the mass control tank 7. This is allowed to happen until a condition is met. This can be but is not limited to, a system pressure, a totalized amount from a flow meter, or a mass reading on the scale. Once the condition is met, the pump is turned off, and all valves go back to their home positions.

The invention thus disclosed in sufficient particularity as to enabling an understanding by those of skill in the art, the following claims encompassing all of the concepts, principles and embodiments thus described, and all equivalents.

The invention claimed is:

1. A heat engine system, comprising:
    a working fluid circuit having a high pressure side and a low pressure side and containing a working fluid, wherein the working fluid comprises carbon dioxide and at least a portion of the working fluid is in a supercritical state;
    a heat exchanger in the working fluid circuit and in thermal communication with a heat source, wherein the heat exchanger is configured to transfer thermal energy from the heat source to the working fluid in the working fluid circuit;
    an expander in the working fluid circuit and disposed between the high pressure side and the low pressure side of the working fluid circuit and configured to convert a pressure drop in the working fluid to mechanical energy;
    a shaft coupled to the expander and configured to drive a device with the mechanical energy;
    a recuperator in the working fluid circuit operative to transfer thermal energy between the high pressure side and the low pressure side of the working fluid circuit;
    a cooler in thermal communication with the working fluid in the low pressure side of the working fluid circuit and configured to remove thermal energy from the working fluid in the low pressure side of the working fluid circuit;
    a pump fluidly coupled to the working fluid circuit between the low pressure side and the high pressure side of the working fluid circuit and configured to circulate the working fluid through the working fluid circuit;
    a mass management system fluidly connected to the working fluid circuit; and
    a working fluid supply tank fluidly connected to the mass management system by a working fluid supply line, wherein the working fluid supply tank is configured to store a working fluid supply and distribute the working fluid supply to the mass management system.

2. The heat engine system of claim 1, wherein the high pressure side of the working fluid circuit contains the working fluid in a supercritical state.

3. The heat engine system of claim 2, wherein the low pressure side of the working fluid circuit contains the working fluid in a subcritical state.

4. The heat engine system of claim 1, wherein the mass management system has a working fluid vessel fluidly connected to the low pressure side of the working fluid circuit.

5. The heat engine system of claim 1, further comprising a variable frequency drive coupled to the pump and configured to control mass flow rate or temperature of the working fluid within the high pressure side of the working fluid circuit.

6. The heat engine system of claim 1, further comprising a generator or an alternator coupled to the expander by the shaft and configured to convert the mechanical energy into electrical energy.

7. The heat engine system of claim 1, wherein the pump is coupled to the expander by the shaft and configured to be driven by the mechanical energy for circulating the working fluid through the working fluid circuit.

8. The heat engine system of claim 1, further comprising a turbopump in the working fluid circuit, wherein the turbopump contains a pump portion coupled to the expander by the shaft and the pump portion is configured to be driven by the mechanical energy.

9. The heat engine system of claim 1, further comprising a turbopump in the working fluid circuit, wherein the turbopump comprises a pump portion coupled to an expansion device.

10. The heat engine system of claim 9, wherein the pump portion of the turbopump is fluidly coupled to the working fluid circuit between the low pressure side and the high pressure side of the working fluid circuit and configured to circulate the working fluid through the working fluid circuit.

11. The heat engine system of claim 9, wherein the expansion device of the turbopump is fluidly coupled to the working fluid circuit between the low pressure side and the high pressure side of the working fluid circuit and configured to drive the pump portion by mechanical energy generated by the expansion of the working fluid.

12. The heat engine system of claim 9, wherein the expansion device and the expander are both turbines.

13. The heat engine system of claim 1, wherein the cooler is a condenser configured to control a temperature of the working fluid in the low pressure side of the working fluid circuit by transferring thermal energy from the working fluid in the low pressure side to a cooling loop outside of the working fluid circuit.

14. A heat engine system, comprising:
    a working fluid circuit having a high pressure side and a low pressure side and containing a working fluid, wherein at least a portion of the working fluid is in a supercritical state;
    a heat exchanger in the working fluid circuit and in thermal communication with a heat source, wherein the heat exchanger is configured to transfer thermal energy from the heat source to the working fluid in the working fluid circuit;
    an expander in the working fluid circuit and disposed between the high pressure side and the low pressure side of the working fluid circuit and configured to convert a pressure drop in the working fluid to mechanical energy;
    a shaft coupled to the expander and configured to drive a device with the mechanical energy;
    a recuperator in the working fluid circuit operative to transfer thermal energy between the high pressure side and the low pressure side of the working fluid circuit;
    a cooler in thermal communication with the working fluid in the low pressure side of the working fluid circuit and configured to remove thermal energy from the working fluid in the low pressure side of the working fluid circuit;
    a turbopump comprising a pump portion coupled to an expansion device, wherein the pump portion is fluidly coupled to the working fluid circuit between the low pressure side and the high pressure side of the working fluid circuit and configured to circulate the working fluid through the working fluid circuit and the expansion device is fluidly coupled to the working fluid circuit between the low pressure side and the high pressure side of the working fluid circuit and configured to drive the pump portion by mechanical energy generated by the expansion of the working fluid;
    a mass management system fluidly connected to the working fluid circuit; and a working fluid supply tank fluidly connected to the mass management system by a working fluid supply line, wherein the working fluid supply tank is configured to store a working fluid supply and distribute the working fluid supply to the mass management system.

15. The heat engine system of claim 14, wherein the high pressure side of the working fluid circuit contains the working fluid in a supercritical state.

16. The heat engine system of claim 15, wherein the low pressure side of the working fluid circuit contains the working fluid in a subcritical state.

17. The heat engine system of claim 16, wherein the working fluid comprises carbon dioxide.

18. The heat engine system of claim 14, further comprising a generator or an alternator coupled to the expander by the shaft and configured to convert the mechanical energy into electrical energy.

19. The heat engine system of claim 14, further comprising a pump coupled to the expander by the shaft and configured to be driven by the mechanical energy.

20. The heat engine system of claim 14, wherein the turbopump further comprises a shaft coupled to and between the pump portion and the expansion device.

21. The heat engine system of claim 14, wherein the mass management system has a working fluid vessel fluidly connected to the low pressure side of the working fluid circuit.

22. The heat engine system of claim 14, wherein the cooler is a condenser configured to control a temperature of the working fluid in the low pressure side of the working fluid circuit by transferring thermal energy from the working fluid in the low pressure side to a cooling loop outside of the working fluid circuit.

23. The heat engine system of claim 14, wherein the expansion device and the expander are both turbines.

24. A heat engine system, comprising:
a working fluid circuit having a high pressure side and a low pressure side and containing a working fluid, wherein at least a portion of the working fluid is in a supercritical state;
a heat exchanger in the working fluid circuit and in thermal communication with a heat source, wherein the heat exchanger is configured to transfer thermal energy from the heat source to the working fluid in the working fluid circuit;
a turbine in the working fluid circuit and disposed between the high pressure side and the low pressure side of the working fluid circuit and configured to convert a pressure drop in the working fluid to mechanical energy;
a shaft coupled to the turbine and configured to drive a device with the mechanical energy;
a recuperator in the working fluid circuit operative to transfer thermal energy from the working fluid in the low pressure side of the working fluid circuit to the working fluid in the high pressure side of the working fluid circuit;
a cooler in thermal communication with the working fluid in the low pressure side of the working fluid circuit and configured to remove thermal energy from the working fluid in the low pressure side of the working fluid circuit;
a pump fluidly coupled to the working fluid circuit between the low pressure side and the high pressure side of the working fluid circuit and configured to circulate the working fluid through the working fluid circuit;
a variable frequency drive coupled to the pump and configured to control mass flow rate or temperature of the working fluid within the high pressure side of the working fluid circuit;
a mass management system fluidly connected to the working fluid circuit; and
a working fluid supply tank fluidly connected to the mass management system by a working fluid supply line, wherein the working fluid supply tank is configured to store a working fluid supply and distribute the working fluid supply to the mass management system.

25. The heat engine system of claim 24, wherein the working fluid comprises carbon dioxide.

26. The heat engine system of claim 24, further comprising a generator or an alternator coupled to the turbine by the shaft and configured to convert the mechanical energy into electrical energy.

27. The heat engine system of claim 24, wherein the pump is coupled to the turbine by the shaft and configured to be driven by the mechanical energy for circulating the working fluid through the working fluid circuit.

28. The heat engine system of claim 24, further comprising a turbopump in the working fluid circuit, wherein the turbopump comprises a pump portion coupled to the turbine by the shaft and the pump portion is configured to be driven by the mechanical energy.

* * * * *

UNITED STATES PATENT AND TRADEMARK OFFICE
CERTIFICATE OF CORRECTION

| | | |
|---|---|---|
| PATENT NO. | : 8,966,901 B2 | Page 1 of 1 |
| APPLICATION NO. | : 13/633966 | |
| DATED | : March 3, 2015 | |
| INVENTOR(S) | : Timothy J. Held et al. | |

It is certified that error appears in the above-identified patent and that said Letters Patent is hereby corrected as shown below:

On the Title Page:

Item 73 the Assignee should read

-- Echogen Power Systems, Inc., Akron, OH (US) --

Signed and Sealed this
Twenty-first Day of July, 2015

Michelle K. Lee
*Director of the United States Patent and Trademark Office*